United States Patent
Otomo et al.

(10) Patent No.: US 9,813,932 B2
(45) Date of Patent: Nov. 7, 2017

(54) DATA COLLECTION METHOD, SYSTEM, AND COMPUTER PRODUCT

(71) Applicant: FUJITSU LIMITED, Kawasaki-shi, Kanagawa (JP)

(72) Inventors: Toshiya Otomo, Kawasaki (JP); Koichiro Yamashita, Hachioji (JP); Takahisa Suzuki, Yokohama (JP); Hiromasa Yamauchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 60 days.

(21) Appl. No.: 14/843,059

(22) Filed: Sep. 2, 2015

(65) Prior Publication Data

US 2015/0382228 A1 Dec. 31, 2015

Related U.S. Application Data

(63) Continuation of application No. PCT/JP2013/056369, filed on Mar. 7, 2013.

(51) Int. Cl.
*H04B 7/00* (2006.01)
*H04W 28/02* (2009.01)
(Continued)

(52) U.S. Cl.
CPC ............ *H04W 28/02* (2013.01); *H04L 67/12* (2013.01); *H04W 4/006* (2013.01); *H04W 84/18* (2013.01)

(58) Field of Classification Search
CPC ... H04W 84/18; H04W 88/04; H04W 88/184; H04W 92/18
(Continued)

(56) References Cited

U.S. PATENT DOCUMENTS 7,230,528 B2 * 6/2007 Kates .................. G08B 25/009
340/521
8,135,863 B2 * 3/2012 Nekovee ................. H04L 47/10
370/395.4
(Continued)

FOREIGN PATENT DOCUMENTS

JP 10-224239 8/1998
JP 2001-210476 8/2001
(Continued)

OTHER PUBLICATIONS

TWOA—Office Action of Taiwanese Patent Application No. 104132069 dated Mar. 17, 2016, with partial English translation of the Office Action.
(Continued)

*Primary Examiner* — Dmitry H Levitan
(74) *Attorney, Agent, or Firm* — Fujitsu Patent Center

(57) ABSTRACT

A data collection method of a system that transmits and receives data by respective communications apparatuses among plural communications apparatuses performing multihop communication, includes suspending transmission of data obtained from a second sensor, a communications apparatus among the plural communications apparatuses suspending the transmission by the second communications apparatus when contents of data obtained from a first sensor of a first communications apparatus among the plural communications apparatuses and contents of data obtained from the second sensor of a second communications apparatus among the plural communications apparatuses are equivalent.

8 Claims, 29 Drawing Sheets

(51) Int. Cl.
*H04W 4/00* (2009.01)
*H04L 29/08* (2006.01)
*H04W 84/18* (2009.01)

(58) Field of Classification Search
USPC .................... 370/310, 328, 400, 437, 477
See application file for complete search history.

(56) References Cited

U.S. PATENT DOCUMENTS

| | | | | |
|---|---|---|---|---|
| 8,510,550 | B2 * | 8/2013 | Westhoff | H04W 12/02 |
| | | | | 709/216 |
| 9,119,019 | B2 * | 8/2015 | Murias | H04W 4/006 |
| 9,225,793 | B2 * | 12/2015 | Dutta | H04L 67/2804 |
| 9,275,093 | B2 * | 3/2016 | Pandey | G06F 17/30333 |
| 2007/0171050 | A1 | 7/2007 | Westhoff et al. | |
| 2008/0068989 | A1 | 3/2008 | Wyk et al. | |
| 2008/0270628 | A1 | 10/2008 | Nekovee et al. | |
| 2010/0183017 | A1 | 7/2010 | Mori | |

FOREIGN PATENT DOCUMENTS

| | | |
|---|---|---|
| JP | 2006-285845 | 10/2006 |
| JP | 2007-018506 | 1/2007 |
| JP | 2010-049584 | 3/2010 |
| WO | 2009-048064 | 4/2009 |

OTHER PUBLICATIONS

International Search Report, mailed in connection with PCT/JP2013/056369 dated Apr. 16, 2013.
"Taiwan Office Action" mailed by Taiwanese Patent Office and corresponding to Taiwan application No. 102141613 on Mar. 10, 2015, with partial English translation.
EESR—The Extended European Search Report of European Patent Application No. 13877418.7 dated Feb. 10, 2016.

* cited by examiner

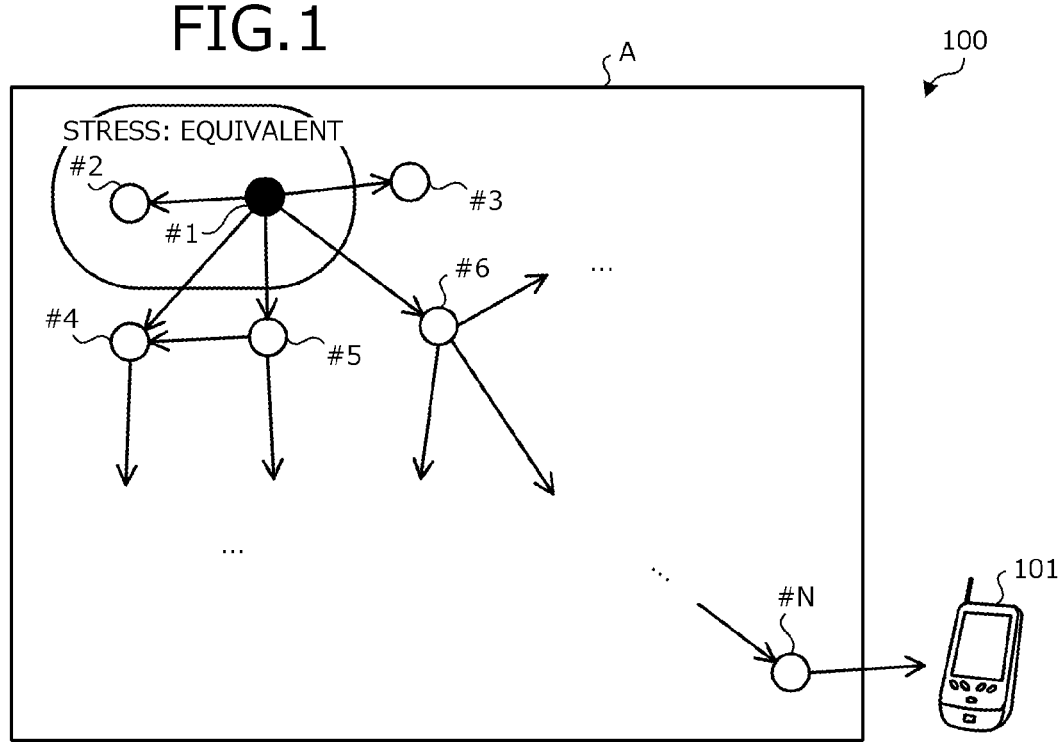

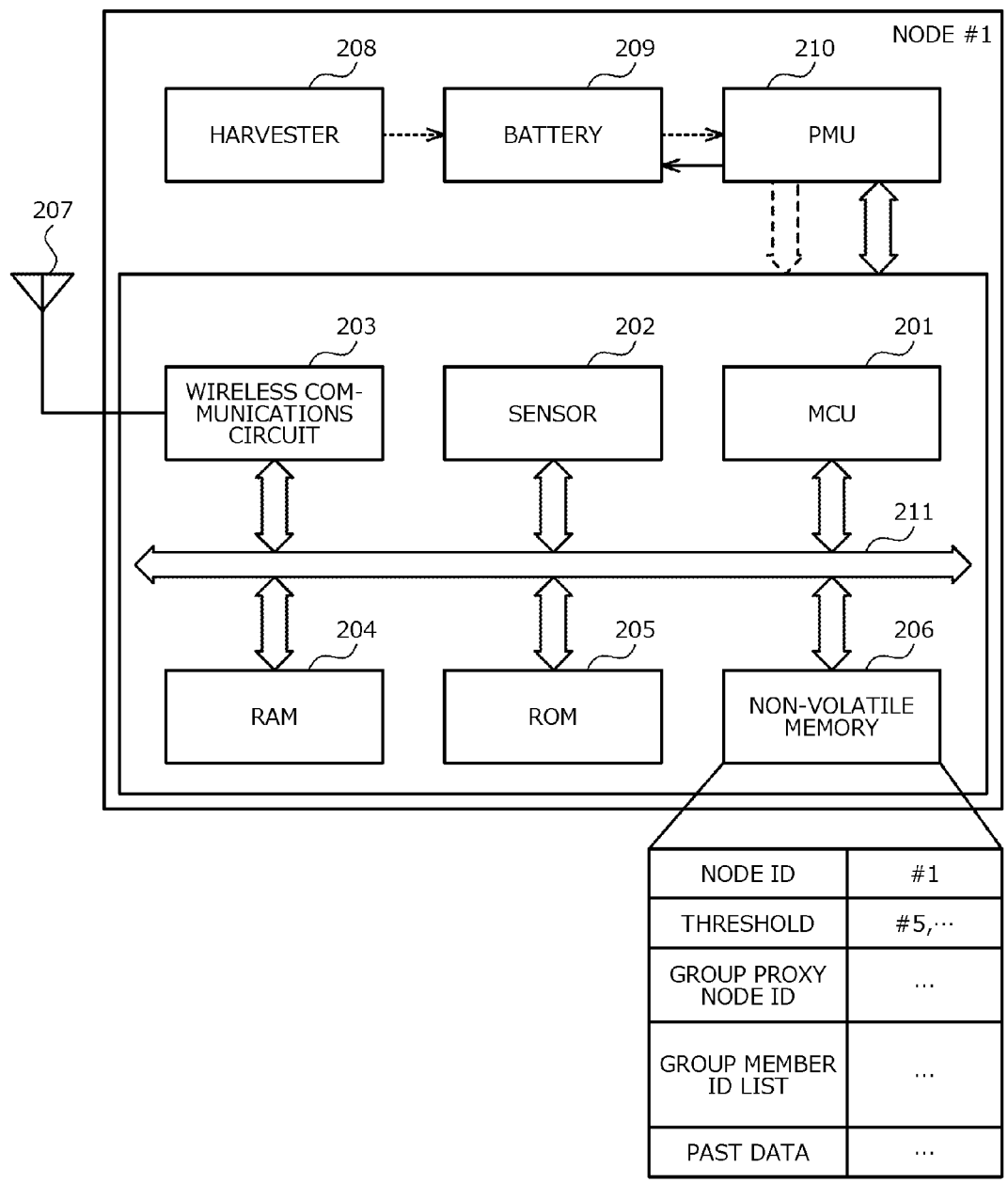

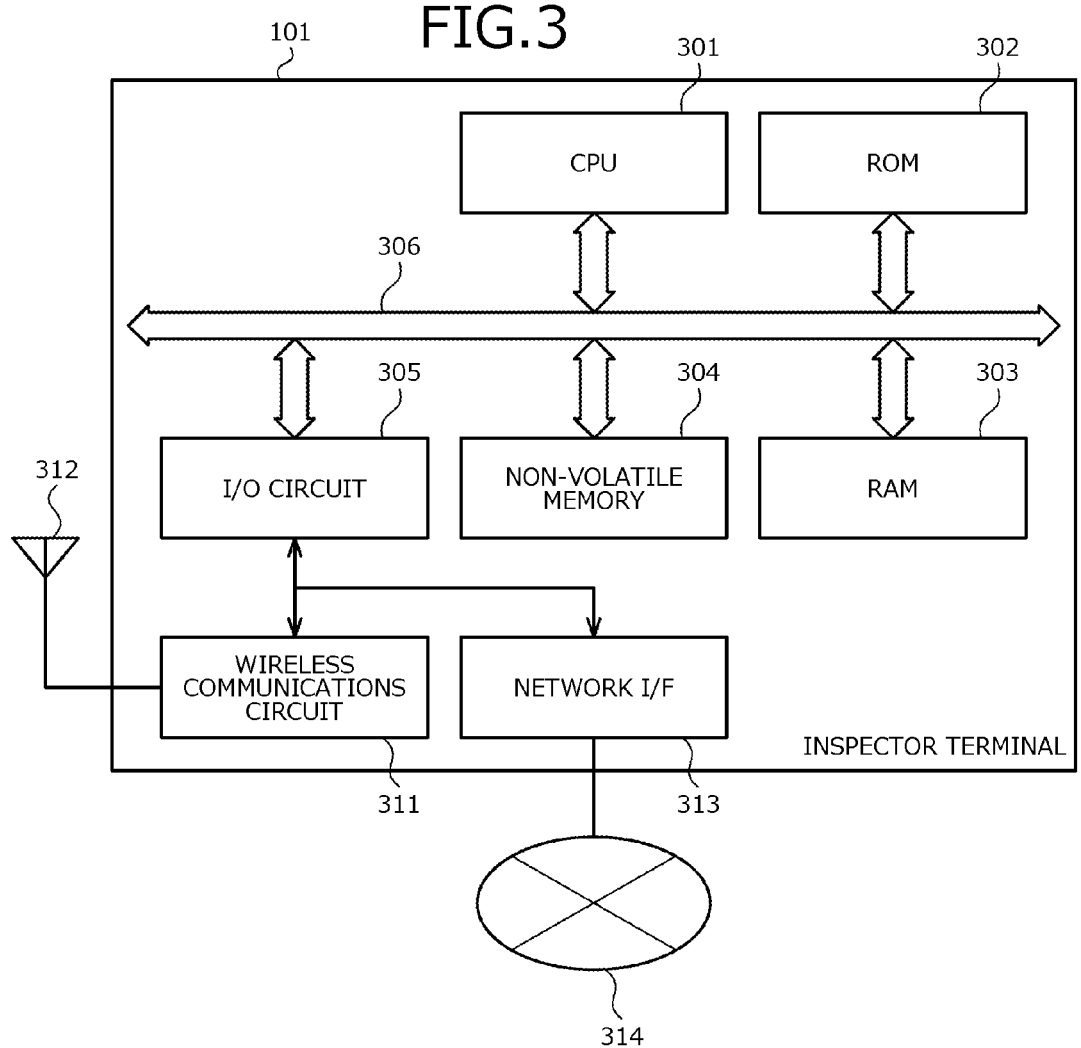
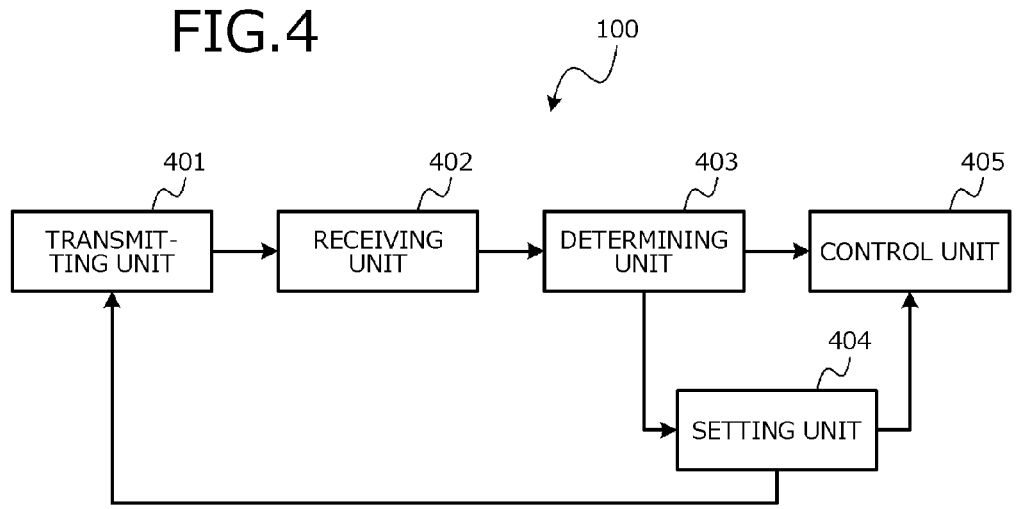

FIG.5

| NO. | SIGNAL NAME | TRANSMISSION CONDITION | TRANSMISSION SOURCE | TRANSMISSION DESTINATION | ACCOMPANYING DATA |
|---|---|---|---|---|---|
| 1 | GROUP CREATION REQUEST | NODE DOES NOT BELONG TO GROUP AND VARIATION OF DATA RELATED TO DETECTION BY SENSOR EXCEEDS THRESHOLD | NODE THAT HAS EXCEEDED THRESHOLD | NEARBY NODE | TRANSMISSION SOURCE ID AND DATA RELATED TO DETECTION BY SENSOR OF TRANSMISSION SOURCE |
| 2 | GROUP CREATION RESPONSE (NEW) | GROUP CREATION REQUEST RECEIVED, NODE DOES NOT BELONG TO GROUP, AND DIFFERENCE BETWEEN DATA OF GROUP CREATION REQUEST AND DATA OF RECIPIENT NODE IS WITHIN THRESHOLD | NODE THAT RECEIVED GROUP CREATION REQUEST | NODE THAT TRANSMITTED GROUP CREATION REQUEST | TRANSMISSION SOURCE ID |
| 3 | GROUP CREATION RESPONSE (ADD) | GROUP CREATION REQUEST RECEIVED, NODE BELONGS TO GROUP, AND DIFFERENCE BETWEEN DATA OF GROUP CREATION REQUEST AND DATA OF RECIPIENT NODE IS WITHIN GIVEN THRESHOLD | NODE THAT RECEIVED GROUP CREATION REQUEST | NODE THAT TRANSMITTED GROUP CREATION REQUEST | GROUP PROXY NODE ID |
| 4 | MEMBER ADDITION REQUEST | GROUP CREATION RESPONSE (ADD) TRANSMITTED | NODE THAT TRANSMITTED GROUP CREATION RESPONSE (ADD) | GROUP PROXY NODE | ID OF NODE TO BE ADDED |
| 5 | GROUP REMOVAL REQUEST | NODE BELONGS TO GROUP AND VARIATION OF DATA RELATED TO DETECTION BY SENSOR EXCEEDS THRESHOLD | NODE THAT HAS EXCEEDED THRESHOLD | NEARBY NODE | TRANSMISSION SOURCE ID AND DATA RELATED TO DETECTION BY SENSOR OF TRANSMISSION SOURCE |
| 6 | GROUP REMOVAL RESPONSE | GROUP REMOVAL REQUEST RECEIVED, NODE BELONGS TO GROUP, AND DIFFERENCE OF DATA OF GROUP REMOVAL REQUEST AND DATA OF RECIPIENT NODE EXCEEDS THRESHOLD | NODE THAT RECEIVED GROUP REMOVAL REQUEST | NODE THAT TRANSMITTED GROUP REMOVAL REQUEST | GROUP PROXY NODE ID |
| 7 | MEMBER REMOVAL REQUEST | TRANSMIT GROUP REMOVAL RESPONSE | NODE THAT TRANSMITTED GROUP REMOVAL RESPONSE | GROUP PROXY NODE | ID OF NODE TO BE DELETED |
| 8 | DATA COLLECTION REQUEST | NONE | INSPECTOR TERMINAL | ALL OF NODES | NONE |
| 9 | DATA COLLECTION RESPONSE | NODE THAT RECEIVED DATA COLLECTION REQUEST AND (DOES NOT BELONG TO GROUP OR IS GROUP PROXY NODE) | NODE THAT DOES NOT BELONG TO GROUP OR GROUP PROXY NODE | NEARBY NODE | TRANSMISSION SOURCE ID, GROUP MEMBER IDs, AND DATA RELATED DETECTION BY SENSOR OF TRANSMISSION SOURCE |
| 10 | PROXY CHANGE REQUEST | TRANSMITTING NODE IS GROUP PROXY NODE AND VARIATION OF DATA RELATED TO DETECTION BY SENSOR THEREOF EXCEEDS THRESHOLD | GROUP PROXY NODE THAT HAS EXCEEDED THRESHOLD | NEARBY NODE | TRANSMISSION SOURCE ID (=GROUP PROXY NODE ID) AND DATA RELATED TO DETECTION BY SENSOR OF TRANSMISSION SOURCE |
| 11 | PROXY CHANGE RESPONSE | PROXY CHANGE REQUEST RECEIVED, TRANSMISSION SOURCE OF PROXY CHANGE REQUEST IS GROUP PROXY NODE OF RECIPIENT NODE, AND DIFFERENCE OF DATA OF PROXY CHANGE REQUEST AND DATA OF RECIPIENT NODE EXCEEDS THRESHOLD | NODE THAT RECEIVED PROXY CHANGE REQUEST | NODE THAT TRANSMITTED PROXY CHANGE REQUEST | NODE ID |
| 12 | GROUP MEMBER ID LIST SIGNAL | NODE THAT RECEIVED PROXY CHANGE RESPONSE AND IS GROUP PROXY NODE | GROUP PROXY NODE THAT RECEIVED PROXY CHANGE RESPONSE | NODE THAT FIRST SENT PROXY CHANGE RESPONSE | GROUP MEMBER ID LIST |
| 13 | PROXY UPDATE REQUEST | NODE THAT RECEIVED GROUP MEMBER ID LIST SIGNAL AND HAS BECOME NEW GROUP PROXY NODE | NEW GROUP PROXY NODE | NODES OF SAME GROUP | FORMER GROUP PROXY NODE ID AND NEW GROUP PROXY NODE ID (=TRANSMISSION SOURCE ID) |

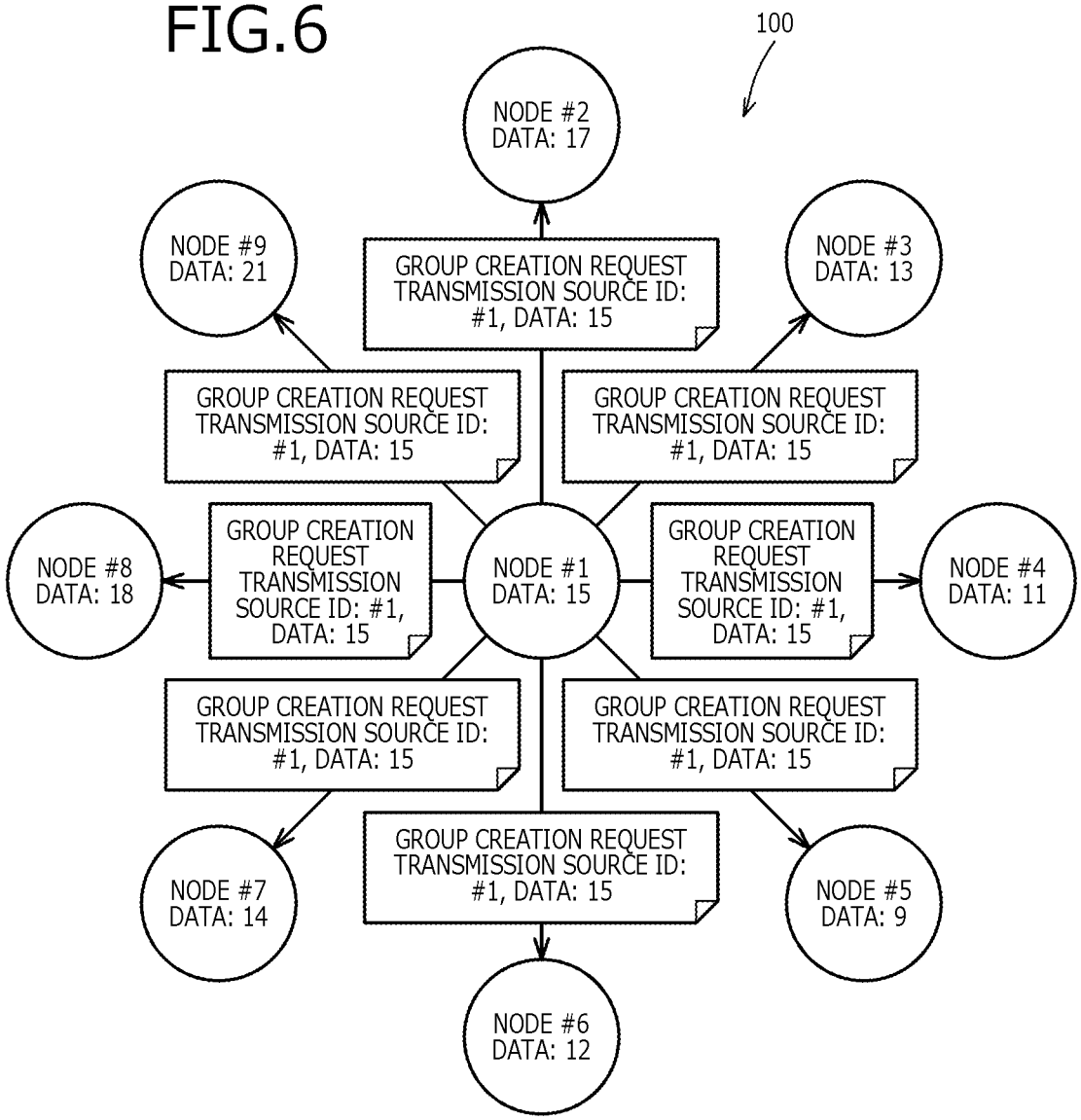

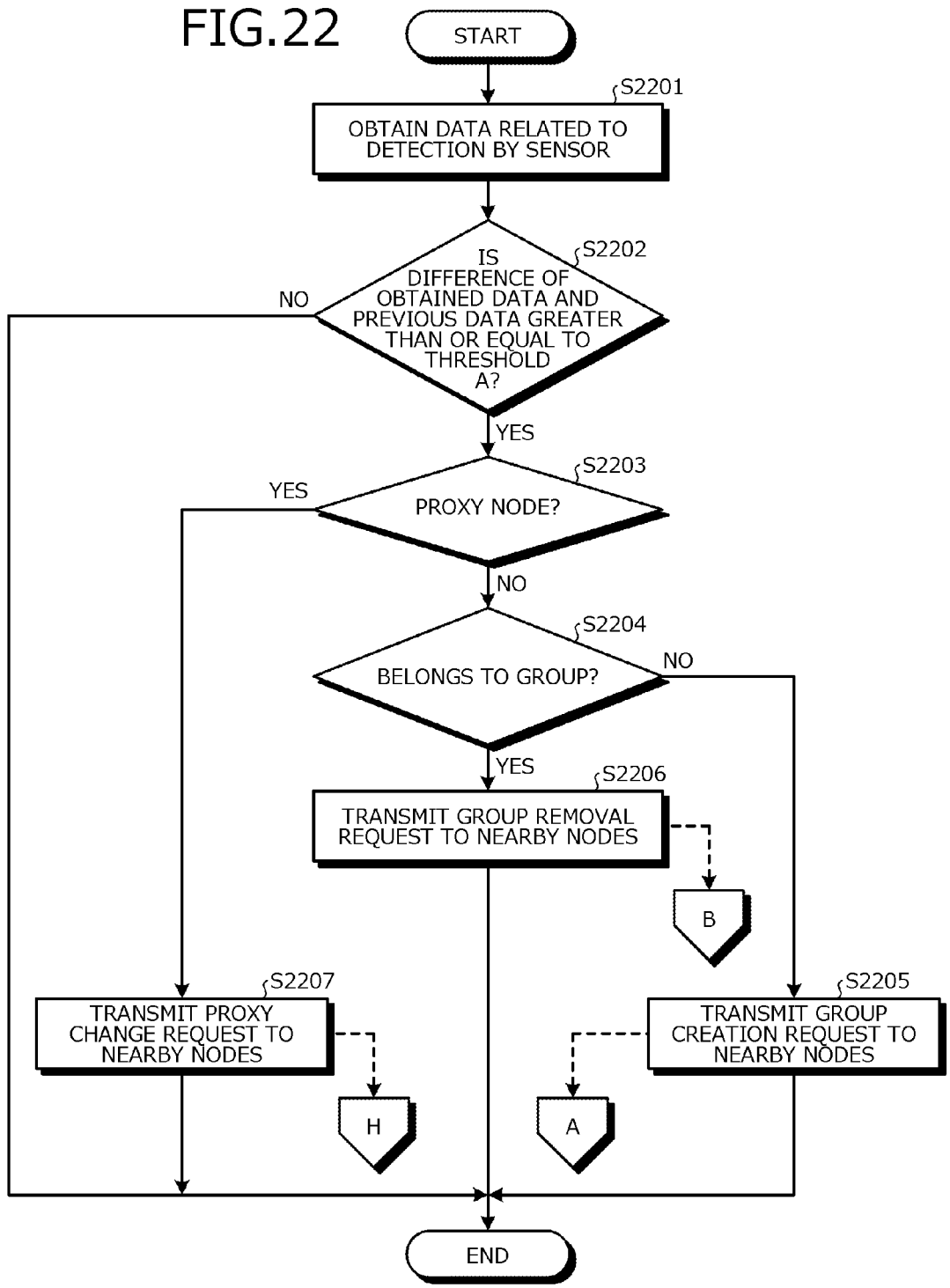

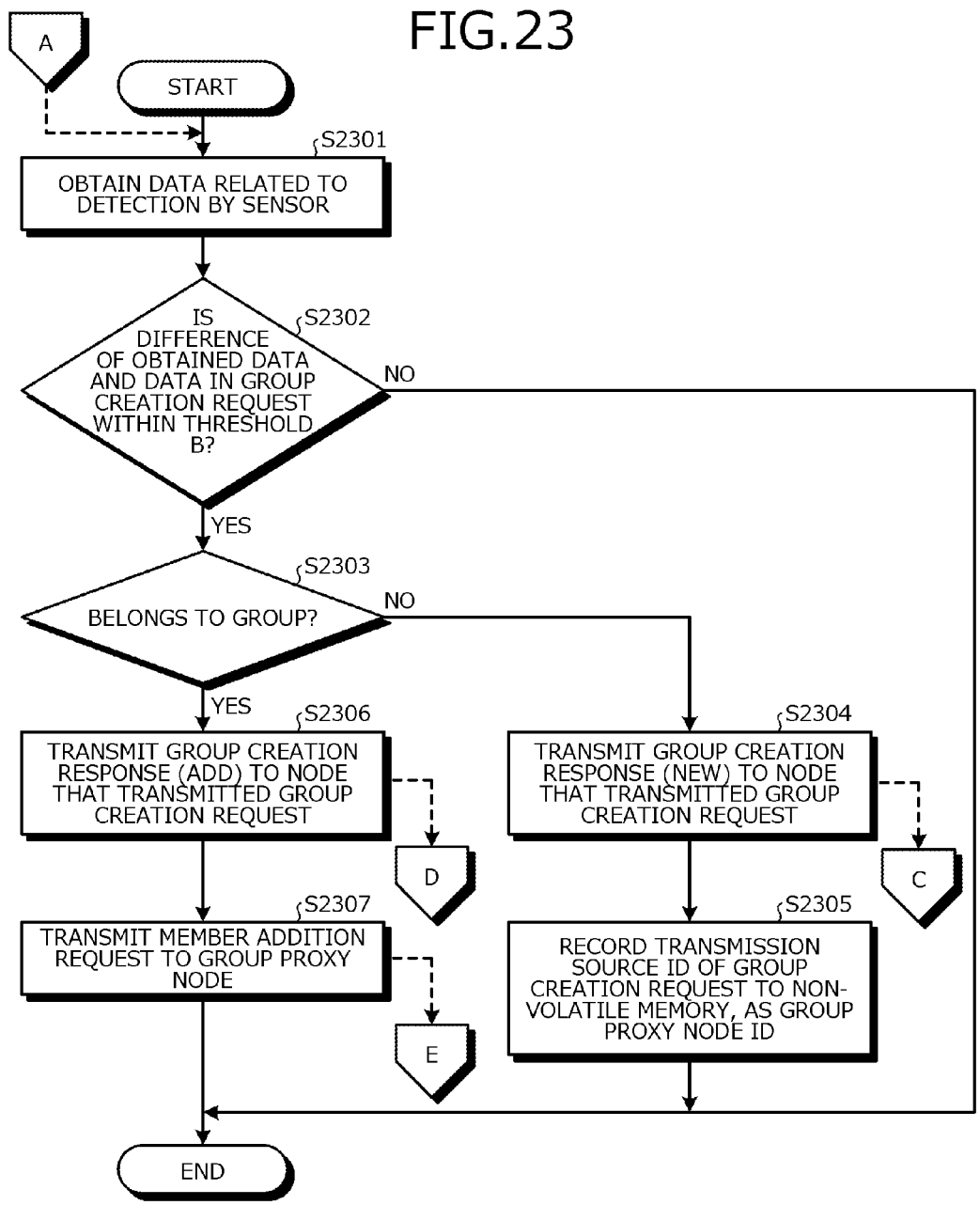

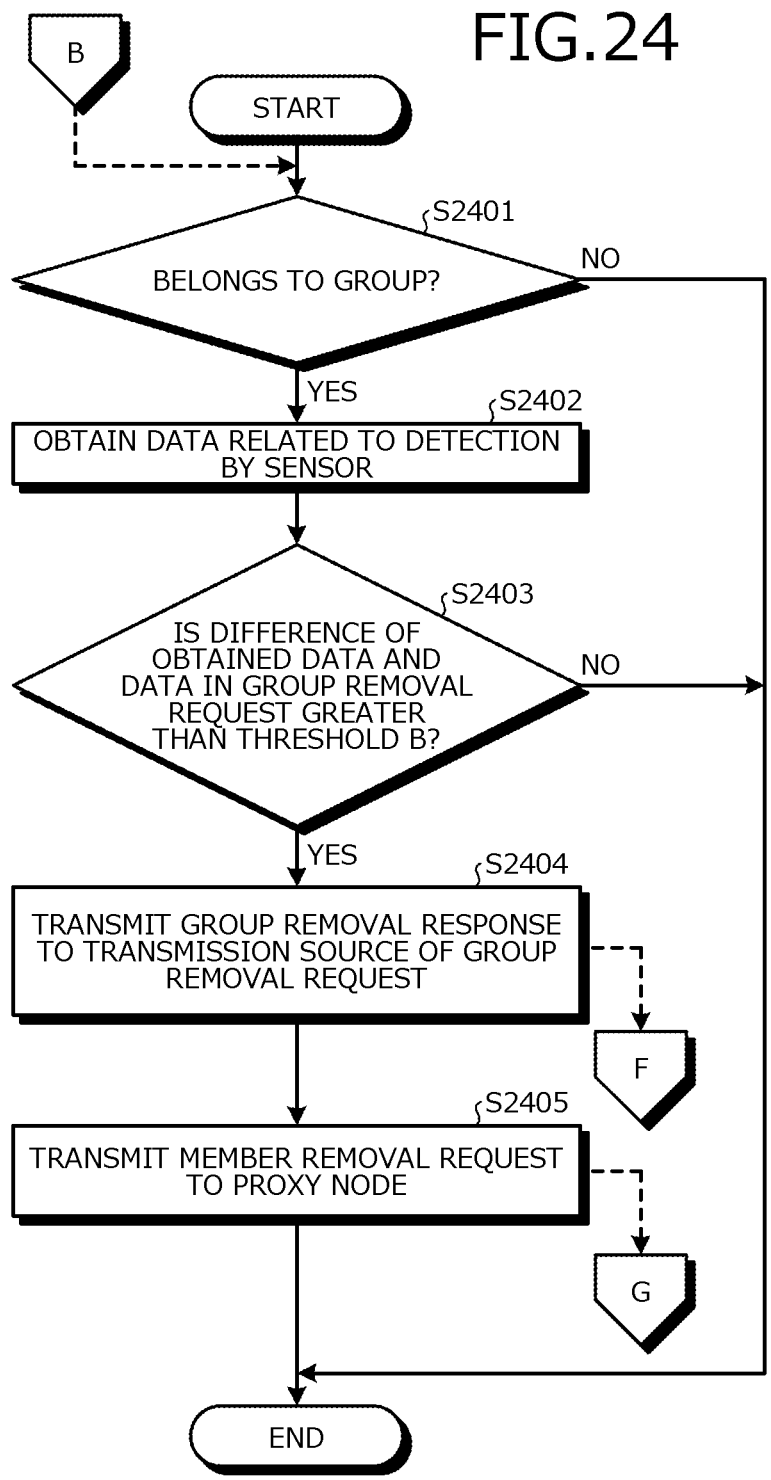

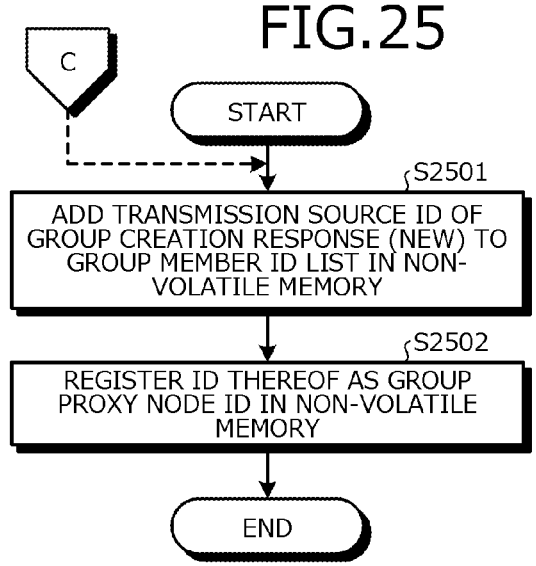
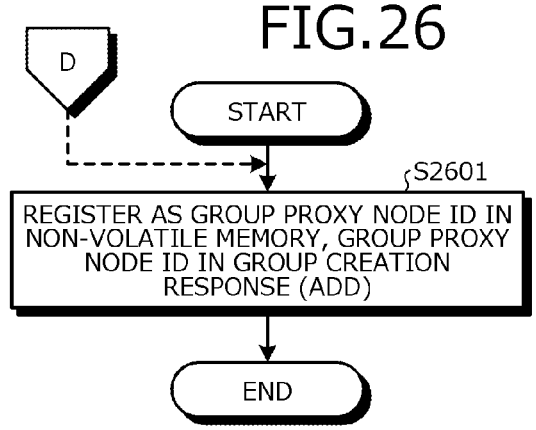
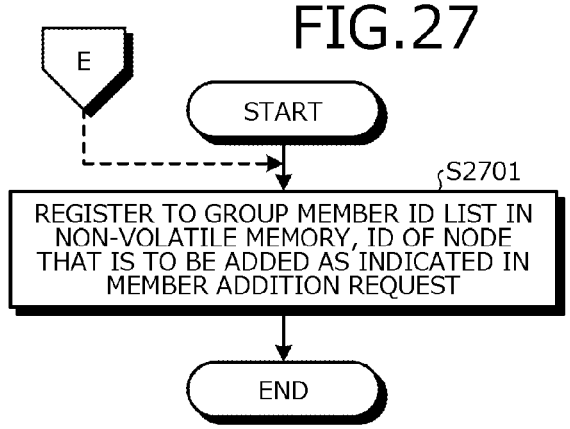

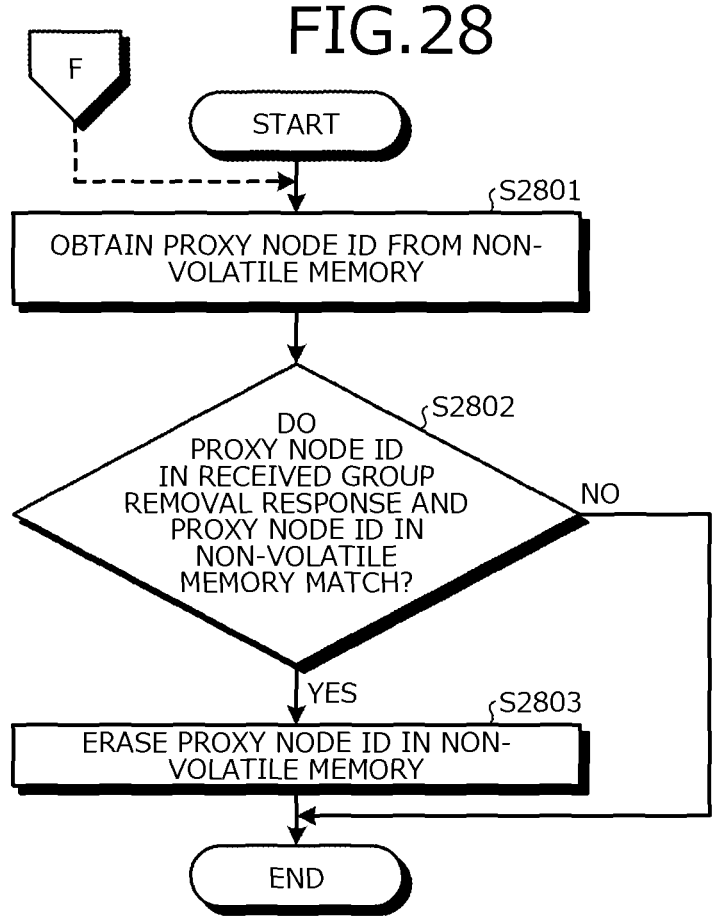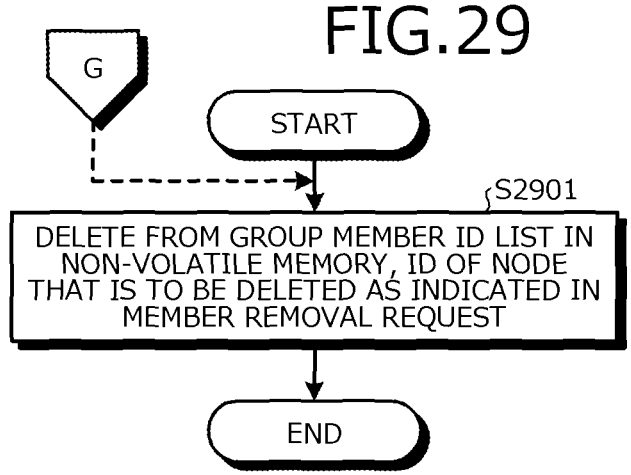

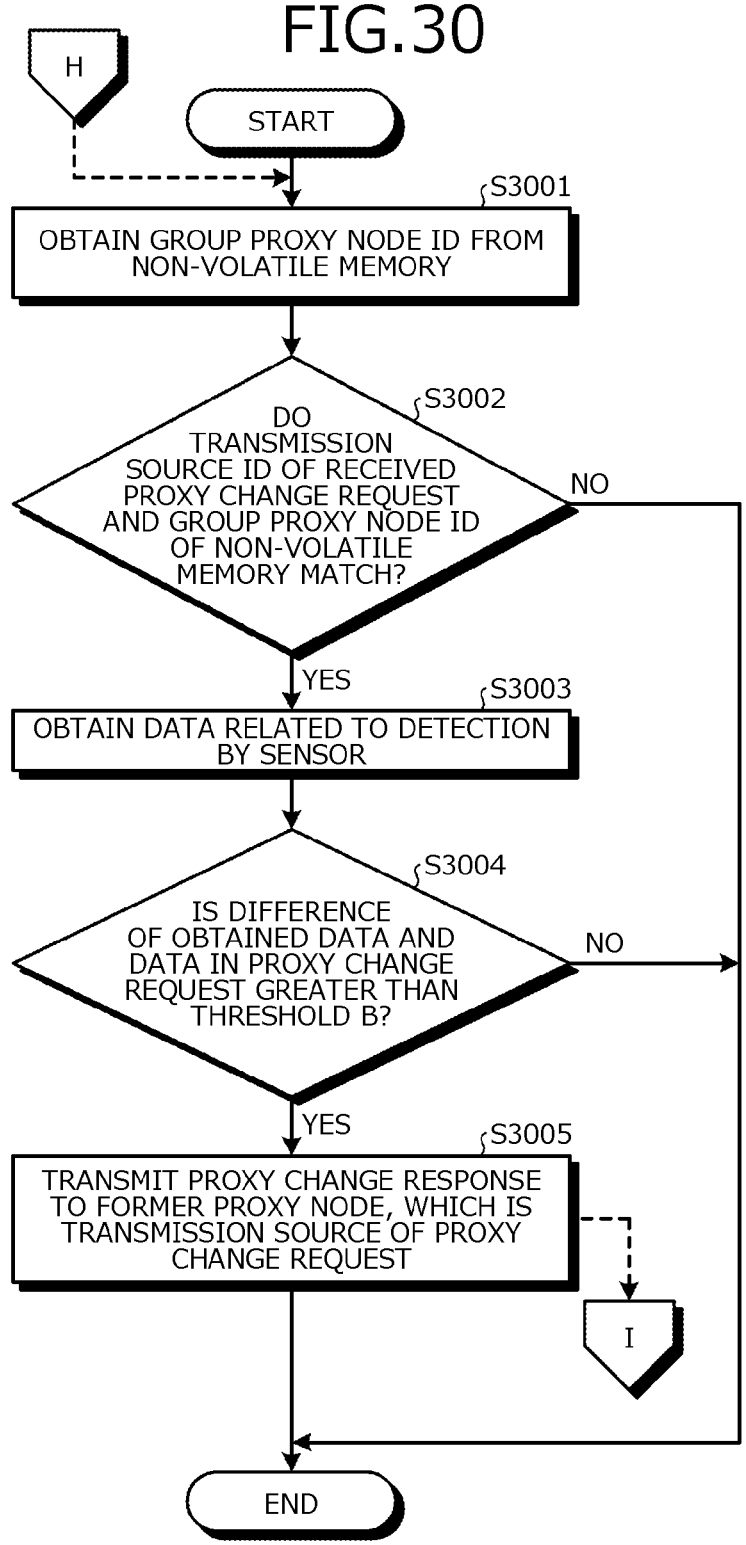

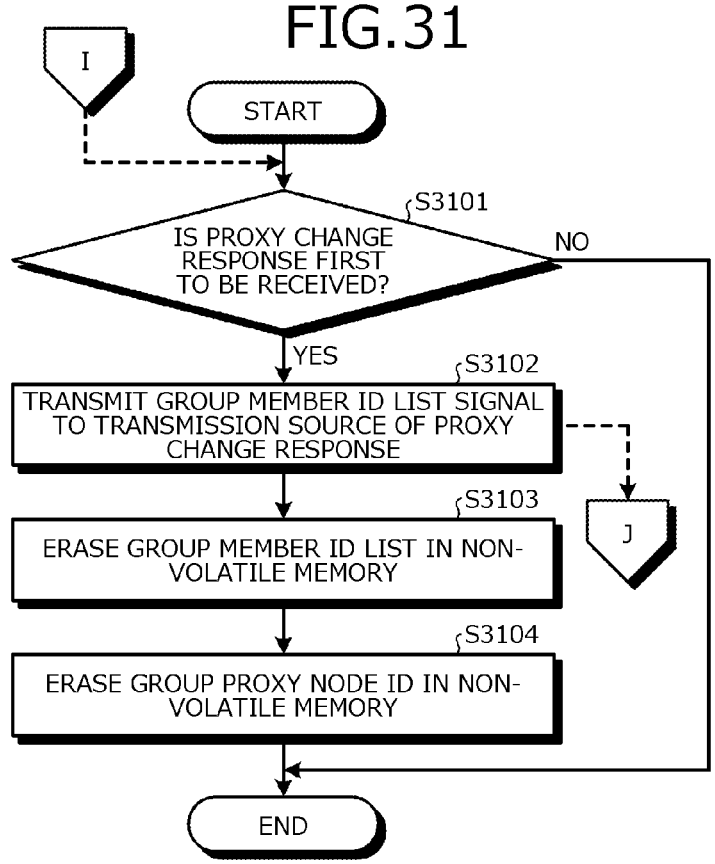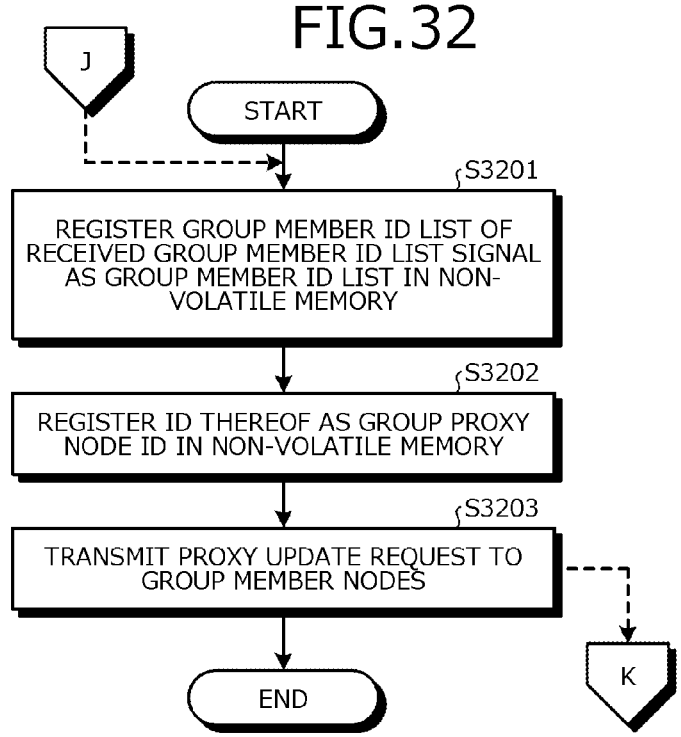

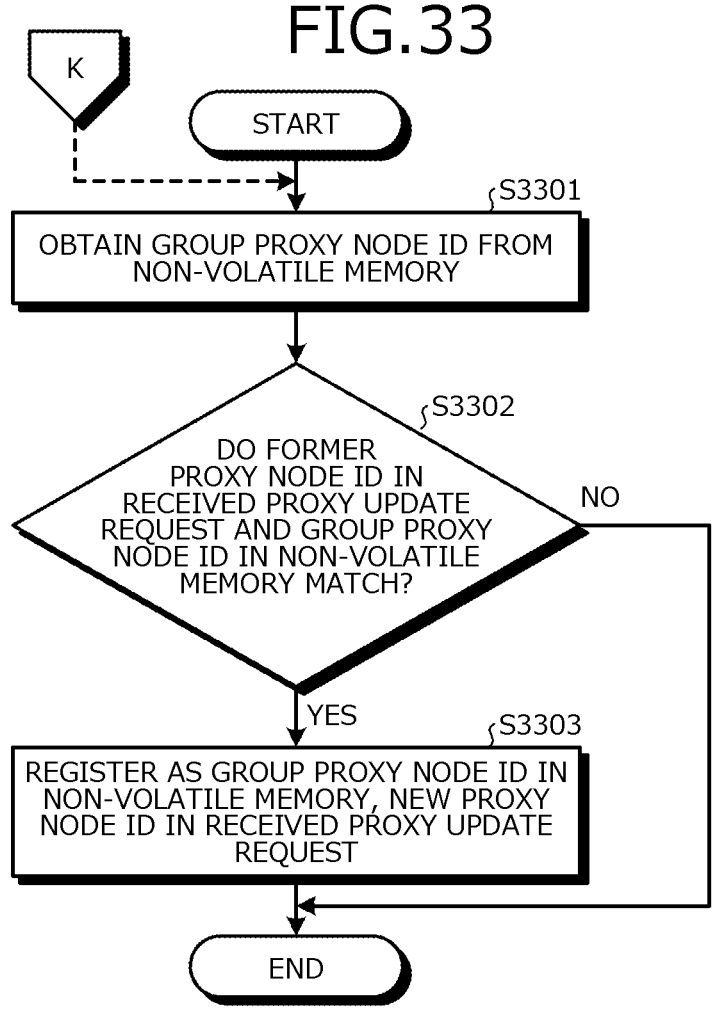

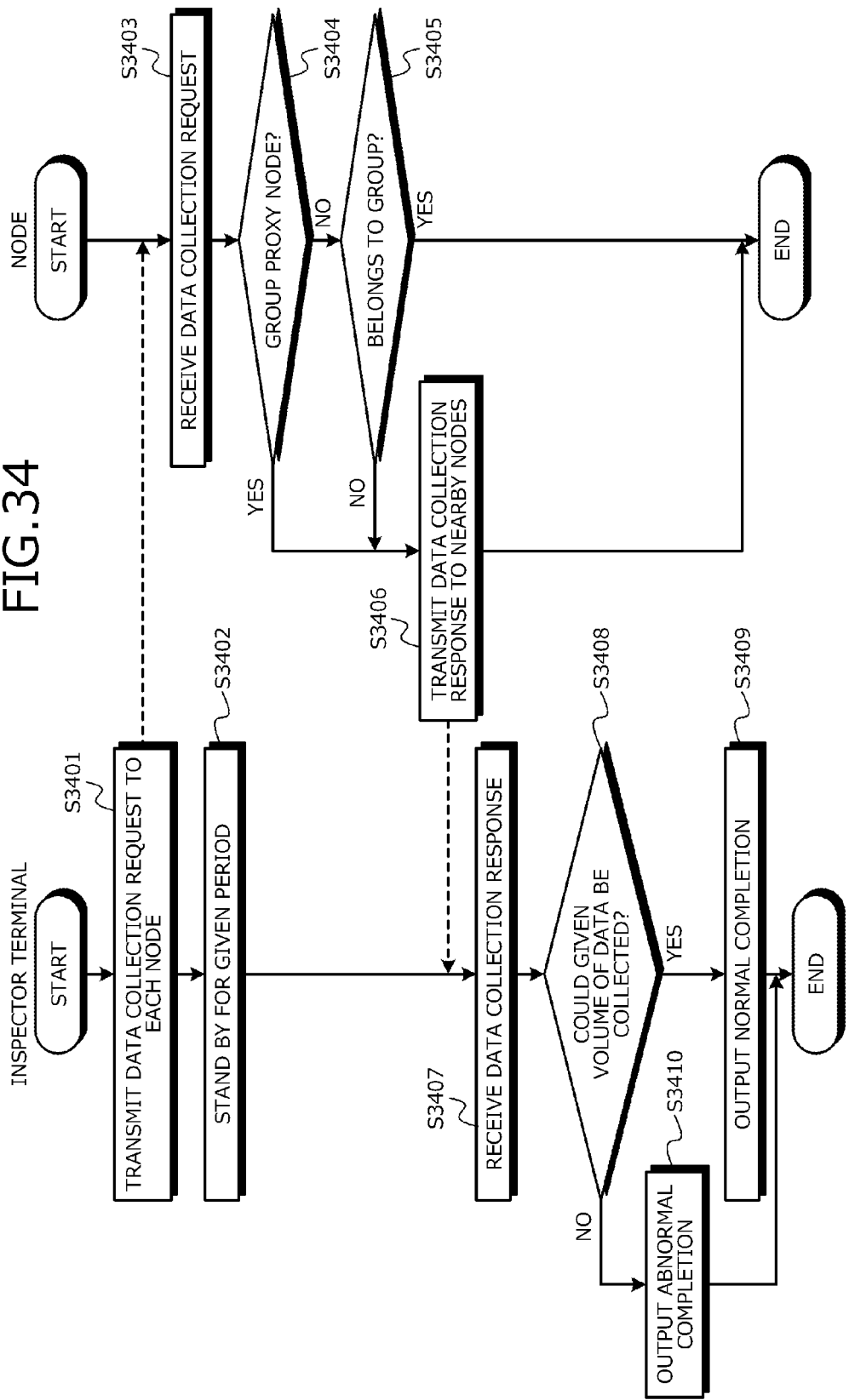

DATA COLLECTION METHOD, SYSTEM, AND COMPUTER PRODUCT

CROSS REFERENCE TO RELATED APPLICATIONS

This application is a continuation application of International Application PCT/JP2013/056369, filed on Mar. 7, 2013 and designating the U.S., the entire contents of which are incorporated herein by reference.

FIELD

Embodiments discussed herein are related to a data collection method, a system, and a computer product.

BACKGROUND

Conventionally, in wireless sensor network (WSN) systems, sensor-equipped nodes are interspersed in a given space and work in concert to enable data concerning environmental and physical conditions to be collected. The nodes in such a system transmit and receive the data by multihop communication.

In a related technology, for example, when a given node equipped with a sensor transmits detection related data to another node and the data transmitted by the given node and detection related data of the sensor of the other node do not match, the other node gives notification that an abnormality has occurred. In another related technology, a sensor node calculates a property amount from observed values obtained during a given interval and only when the property amount is determined to have exceeded a given threshold, transmits the observed values obtained during the given interval to a server. Further, in another related technology, only values within a range of physical amounts detected by an integrated state sensor used in a monitoring device are recognized and transmission is performed only when an abnormality is detected. (For examples, refer to Japanese Laid-Open Patent Publication Nos. 2006-285845 and 2010-049584, and International Publication No. 2009/048064.

Nonetheless, with the conventional technologies, when the data obtained by the sensors of the nodes in the system are to be aggregated and collected by a given node, each of the nodes transfers data and the data aggregates at the given node, whereby the volume of communicated data in the system overall increases.

SUMMARY

According to an aspect of an embodiment, a data collection method of a system that transmits and receives data by respective communications apparatuses among plural communications apparatuses performing multihop communication, includes suspending transmission of data obtained from a second sensor, a communications apparatus among the plural communications apparatuses suspending the transmission by the second communications apparatus when contents of data obtained from a first sensor of a first communications apparatus among the plural communications apparatuses and contents of data obtained from the second sensor of a second communications apparatus among the plural communications apparatuses are equivalent.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram depicting an example of a data collection method of a system of an embodiment;
FIG. 2 is a block diagram depicting an example of hardware configuration of a node;
FIG. 3 is a block diagram of an example of hardware configuration of an inspector terminal;
FIG. 4 is a block diagram depicting a functional example of the system;
FIG. 5 is a diagram depicting an example of a list of signals transmitted by nodes and the inspector terminal;
FIG. 6 is a diagram (part 1) depicting an example of group creation;
FIG. 22 is a flowchart of a procedure of a data obtaining process;
FIG. 23 is a flowchart of a procedure of a group creation request reception process;
FIG. 24 is a flowchart of a procedure of a group removal request reception process;
FIG. 25 is a flowchart of a procedure of a group creation response (new) reception process;
FIG. 26 is a flowchart of a procedure of a group creation response (add) reception process;
FIG. 27 is a flowchart of a procedure of a member addition request reception process;
FIG. 28 is a flowchart of a procedure of a group removal response reception process;
FIG. 29 is a flowchart of a procedure of a member removal request reception process;
FIG. 30 is a flowchart of a procedure of a proxy change request reception process;

FIG. 31 is a flowchart of a procedure of a proxy change response reception process;

FIG. 32 is a flowchart of a procedure of a group member ID list signal reception process;

FIG. 33 is a flowchart of a procedure of a proxy update request reception process; and FIG. 34 is a flowchart of a procedure of a data collection process.

DESCRIPTION OF EMBODIMENTS

Figure 7:
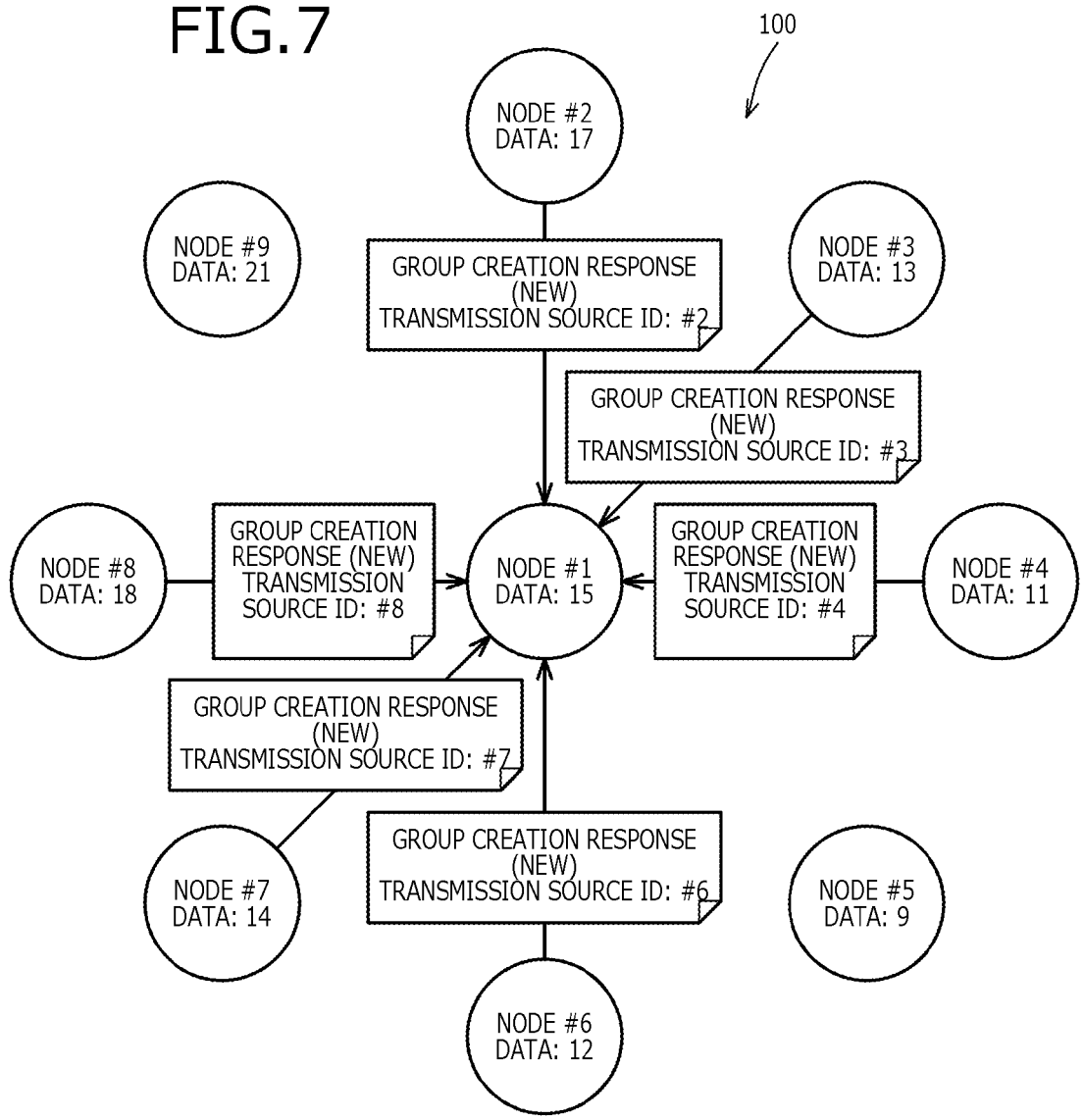
FIG. 7 is a diagram (part 2) depicting an example of group creation.

Embodiments of a data collection method, a system, and a data collection program will be described in detail with reference to the accompanying drawings.

FIG. 1 is a diagram depicting an example of a data collection method of a system of the present embodiment. A system 100 has nodes #1 to #6, . . . , #N and an inspector terminal 101. N is a positive integer. The nodes #1 to #6, . . . , #N are disposed in a given area A. The given area A, for example, is an area filled with matter such as concrete, soil, water, air, etc. The nodes #1 to #6, . . . , #N are sensor-equipped communication apparatuses. The nodes #1 to #6, . . . , #N have energy harvesting elements and operate by the power generated by the energy harvesting elements. The nodes #1 to #6, . . . , #N are activated when sufficiently charged and perform intermittent operation of data transmission and sleeping. Further, since the power generated by the energy harvesting elements is limited, nodes #1 to #6, . . . , #N have a low power consuming short-range radio circuit and, transmit and receive data by multihop communication.

The nodes #1 to #6, . . . , #N obtain from the respective sensors thereof, data related to detection of temperature, moisture content, stress, etc. in the given area A. The inspector terminal 101 collects the data related to detection by nodes #1 to #6, . . . , #N. The collected data is aggregated in a server and used in analysis processing.

For example, the given area A is concrete of a tunnel in a remote area. An inspector visits the site once a month and operates the inspector terminal 101 such that data collection is performed. The inspector terminal 101 collects data related to the stress detected by the sensors of nodes #1 to #6, . . . , #N.

When collecting the data, the inspector terminal 101 transmits a data collection request to nodes #1 to #6, . . . , #N. The nodes #1 to #6, . . . , #N that receive the data collection request transmit the respective data thereof to nearby nodes within reach of short-range radio waves, sleep, and recharge until again operable. A node that has received the data of another node transmits the received data to nearby nodes, sleeps, and recharges until again operable. The nodes #1 to #6, . . . , #N repeatedly transfer the data until the data reaches the inspector terminal 101.

Here, it takes time for the inspector terminal 101 to collect data from nodes #1 to #6, . . . , #N. More specifically, when a given node emits a radio wave to send data, other nodes emit radio waves to transfer the data. The other nodes recharge after emitting the radio waves and therefore, data generation by a subsequent node occurs after a recharging period. The time consumed for the inspector terminal 101 to collect data from all the nodes is calculated by ((data arrival period+recharging period)×node count). The data arrival period is assumed to be negligible; the recharging period is assumed to be 1 minute; and the node count is assumed to be 1000. In this case, it takes 17 hours for the inspector terminal 101 to collect data from all the nodes.

Thus, in the system 100 according to the present embodiment, a given node among a group of nodes for which the contents of the data of the sensors are similar transmits the data as a proxy of the group, and the other nodes leave the data transmission to the given node and only perform data transfer. As a result, in the system 100, the volume of data communicated in the system overall is reduced and the occurrence of recharging to send data is reduced, whereby the time consumed for collecting all the data can be shortened.

First, an arbitrary node among nodes #1 to #6, . . . , #N, determines whether the contents of data obtained by the sensor of node #1, as a first node, and the contents of the data obtained by the sensor of node #2, as a second node, are equivalent. The arbitrary node may be node #1, node #2, or a node other than node #1 or node #2.

For example, if the arbitrary node is node #1, node #1 receives the data of node #2, compares the received data and the data obtained by the sensor of node #1, and determines whether the contents of the data are equivalent. Further, if the arbitrary node is node #4, node #4 receives the data of node #1 and the data of node #2, compares the received data, and determines whether the contents of the data are equivalent. In the example depicted in FIG. 1, the arbitrary node is assumed to be node #2 and node #2 receives the data of node #1, compares the received data and the data obtained by the sensor of node #2, and determines whether the contents of the data are equivalent.

Further, concerning whether the contents of the data are equivalent, the arbitrary node determines that the contents of the data are equivalent when the 2 data satisfy a condition specified by the developer of the system 100. The specified condition, for example, may be that the difference of the 2 data is within a threshold, the difference of the 2 data exceeds a threshold, etc.

If the contents of the data are determined to be equivalent, an arbitrary node among nodes #1 to #6, . . . , #N suspends with respect to the data obtained by the sensor of node #2, transmission thereof by node #2. The arbitrary node that suspends the transmission may be the same node that determined the contents to be equivalent or may be a different node. If a different node, the node that made the determination gives notification of the determination result to the node that suspends transmission. In the example depicted in FIG. 1, node #2 suspends the transmission of the data obtained by the sensor of node #2. As a result of data transfer, the inspector terminal 101 collects the data of the sensors in the system 100. The collected data, for example, is the data from sensors of nodes in a vicinity of a location where a concentration of stress in the given area A occurred, and the data of a sensor of a given node that transmitted the data as a proxy of a group of nodes in a vicinity of the location where the concentration of stress in the given area A occurred.

By suspending the data transmission, the system 100 can reduce the volume of data transferred. By a reduction in the volume of data transferred, the inspector terminal 101 can reduce the period from the transmission of a data collection request to nodes #1 to #N until the data is received. For example, if the data transmission of node #2 is not suspended, node #2 transmits the data of node #2 to nearby node #5, which has recharged. Node #1 transmits the data of node #1 to node #5 after the elapse of the recharging period. In comparison, the system 100 according to the present embodiment suspends the data transmission of node #2, enabling data transmission without waiting for the recharging period, whereby the period elapsing until data is received can be shortened. The system 100 according to the present embodiment will be described with reference to FIGS. 2 to 34.

FIG. 2 is a block diagram depicting an example of hardware configuration of a node. In the example depicted in FIG. 2, hardware configuration of node #1 is depicted as an example. Other nodes also have the same hardware configuration as node #1. Node #1 has a microprocessor (hereinafter, referred to as "micro control unit (MCU)") 201, a sensor 202, a wireless communications circuit 203, random access memory (RAM) 204, read-only memory (ROM) 205, non-volatile memory 206, an antenna 207, a harvester 208, a battery 209, and a power management unit (PMU) 210. Node #1 further has a bus 211 connecting the MCU 201, the sensor 202, the wireless communications circuit 203, the RAM 204, the ROM 205, and the non-volatile memory 206.

The MCU 201 is a computation processing apparatus that governs overall control of node #1. For example, the MCU 201 processes data related to detection by the sensor 202. The sensor 202 is an apparatus that detects a given change at the installation site. For example, a piezoelectric element that detects voltage at the installation site, an element that detects temperature, a photoelectric element that detects light, and the like can be used as the sensor 202. The antenna 207 transmits and receives radio waves wirelessly communicated with a parent device. The wireless communications circuit 203 (radio frequency (RF)) outputs received radio waves as reception signals and transmits transmission signals as radio waves via the antenna 207. The wireless communications circuit 203 may be a communications circuit that uses short-range radio waves enabling communication with other nodes within a vicinity of several tens of centimeters.

The RAM 204 is a storage apparatus that stores transient data of processing at the MCU 201. The ROM 205 is a storage apparatus that stores process programs, etc. executed by the MCU 201. The non-volatile memory 206 is a writable storage apparatus and retains given data written thereto, even when the power supply ceases. For example, flash memory is employed as the non-volatile memory 206.

The harvester 208 is the energy harvesting element described with reference to FIG. 1 and is an apparatus that generates electrical power based on the external environment of the installation site of node #1, such as energy changes, changes in light, vibration, temperature, radio waves (received radio waves) and the like. Further, the harvester 208 may generate electrical power in response to changes detected by the sensor 202. The battery 209 is an apparatus that stores the electrical power generated by the harvester 208. In other words, node #1 internally generates the electrical power necessary for operation without the need of a secondary battery or external power source. The PMU 210 is an apparatus that controls the supply of the electrical power stored by the battery 209 as a driving source of the components of the node.

The non-volatile memory 206 has an area that stores a node identification (ID) of node #1, a threshold, a group proxy node ID, group member ID list, and past data. The node ID is identification information given to each node. In the present embodiment, description will be given using #1, . . . , #N as node IDs. The threshold is a value used in determining whether grouping is to be performed. The threshold is specified by the manager of the system 100. For example, when increasing the number of nodes belonging to the same group and reducing the volume of communication in the system 100, the manager of the system 100 specifies a larger threshold.

The group proxy node ID is a node ID that represents the group to which the node (e.g., node #1) belongs. The group member ID list is a list of node IDs belonging to the group. Past data is data obtained by the sensor 202.

FIG. 3 is a block diagram of an example of hardware configuration of the inspector terminal. The inspector terminal 101 has a central processing unit (CPU) 301, large-capacity ROM 302, RAM 303 and non-volatile memory 304, an interface input/output (I/O) circuit 305, a wireless communications circuit 311, an antenna 312, and a network I/F 313. The CPU 301 may be more sophisticated than the MCU 201 of the node. The inspector terminal 101 further has a bus 306 connecting the CPU 301, the ROM 302, the RAM 303, the non-volatile memory 304, and the I/O circuit 305. The inspector terminal 101, unlike the nodes, may operate by an external power supply, or may operate by an internal power supply. The non-volatile memory 304 stores an ID list of nodes in the system 100.

The wireless communications circuit 311 and the antenna 312 as well as the network I/F 313 are connected to the I/O circuit 305. As a result, the inspector terminal 101 can wirelessly communicate with the nodes, via the wireless communications circuit 311 and the antenna 312. The wireless communications circuit 311 may be a communications circuit that uses short-range radio waves enabling communication with nodes within a vicinity of several tens of centimeters, or may be a communications circuit that uses intermediate-range radio waves enabling communication with distant nodes. The inspector terminal 101 can communicate with an external apparatus such as a server, through a network 314 such as the Internet, by Internet Protocol (IP) processing, via the network I/F 313.

Functions of the system 100 will be described. FIG. 4 is a block diagram depicting a functional example of the system. The system 100 includes a transmitting unit 401, a receiving unit 402, a determining unit 403, a setting unit 404, and a control unit 405. Functions of the transmitting unit 401 to the control unit 405 are realized by executing on the MCU 201, a program stored in a storage apparatus. The storage apparatus, more specifically, for example, is the ROM 205, the RAM 204, the non-volatile memory 206, etc. depicted in FIG. 2.

Any of the nodes among nodes #1 to #N may have the transmitting unit 401 to the control unit 405. For example, node #1 may have the transmitting unit 401; and node #2 may have the receiving unit 402 to the control unit 405. Alternatively, nodes #1 and #2 may have the transmitting unit 401; node #3 may have the receiving unit 402 and the determining unit 403; and node #4 may have the setting unit 404 and the control unit 405.

The transmitting unit 401 transmits data obtained by the sensor 202 of the node thereof. When the setting unit 404 sets the first and second nodes to be in the same group, the transmitting unit 401 may transmit by the first node, data obtained by a first sensor 202 and identification information indicating that the first and second nodes are in the same group. Identification information indicating that the first and second nodes are in the same group may be the identification information of the nodes, or any value that enables discrimination from the identification information of another group and, for example, is a concatenated value of the identification information of the nodes belonging to the group.

For example, if the setting unit 404 has set nodes #1 and #2 to be in the same group, the transmitting unit 401 transmits the data of node #1 and #1#2, which is a concatenation of the identification information of nodes #1 and #2. The data obtained by the sensor 202, for example, is a value of pressure when the sensor 202 is a piezoelectric element; is a temperature value when the sensor 202 is an element that detects temperature; and is a value of illuminance or brightness when the sensor 202 is an element that detects light.

Further, the transmitted data may be the data as it is obtained by the sensor 202, or coded data obtained by coding the data obtained by the sensor 202. Further, the transmitting unit 401 may transmit by the first node, the data obtained by the first sensor 202, a characterizing value of the data of the sensors in the group such as an average value or distribution of the data of the group, etc.

After the setting unit 404 has set the first node and the second node to be in the same group, if the second node is removed from the group, the transmitting unit 401 may transmit by the first node, the data obtained by the first sensor 202 and the ID of the first node.

After the setting unit 404 has set the first node and the second node to be in the same group, if the first node is removed from the group, the transmitting unit 401 may transmit by the first node, the data obtained by the first sensor 202 and the ID of the first node.

Here, after the setting unit 404 has set the first node and plural second nodes to be in the same group, the first node is assumed to be removed from the group. In this case, the transmitting unit 401 may transmit by any one of the second nodes in the group, the data obtained by the sensors 202 of the plural second nodes and identification information of the nodes in the group.

For example, the first node is assumed to be node #1, the second node is assumed to be nodes #2 and #3, and node #1 is assumed to be removed from the group. In this case, the transmitting unit 401 transmits by node #2 or #3, the data of the node and the identification information #1,#2 of the nodes #1 and #2. Further, the transmission destination of the transmitting unit 401 is a nearby node at a position enabling communication by the wireless communications circuit 203.

The receiving unit 402 receives data obtained by the sensor 202 of another node. For example, the receiving unit 402 receives the data transmitted by the transmitting unit 401. The received data is stored in a storage area of the RAM 204, the non-volatile memory 206, etc.

The determining unit 403 determines whether the contents of the data obtained by the first sensor 202, which is of the first node, and the contents of the data obtained by a second sensor 202, which is of the second node, are equivalent. The first node and the second node may be capable of communicating directly without multihopping, or may be capable of communicating by a given hop count. The given hop count is specified by the manager of the system 100. For example, the manager of the system 100 sets the hop count by the given area A or the object of measurement by the sensor 202, etc.

The determining unit 403 may determine whether the contents of data newly obtained by the first sensor 202 and the contents of data newly obtained by the second sensor 202 are equivalent. Here, the data newly obtained by the first sensor 202 is assumed to have varied from data of the first sensor 202 at the time of the previous determination. In this case, the determining unit 403 may determine that the contents of the data newly obtained by the first sensor 202 and the contents of the data newly obtained by the second sensor 202 are not equivalent. The same is true when the data newly obtained by the second sensor 202 has varied from the data of the second sensor 202 at the time of the previous determination.

The received data is stored to a storage area of the RAM 204, the non-volatile memory 206, etc. Further, the determining unit 403 may transmit the determination result to another node different from the node that executed the determining unit 403.

The setting unit 404 sets the first node and second node to be in the same group, when the determining unit 403 determines that the contents of the data obtained by the first sensor 202 and the contents of the data obtained by the second sensor 202 are equivalent.

The setting unit 404 removes the second node from the group, when transmission of the data obtained by the second sensor 202 is to be resumed by the second node.

The setting unit 404 removes the first node from the group, when the contents of the data obtained by the first sensor 202 have varied after transmission by the second node has been suspended for the data obtained by the second sensor 202. Setting results are stored to an area of the non-volatile memory 206, storing the group member ID list.

The control unit 405 suspends with respect to the data obtained by the second sensor 202, transmission thereof by the second node, when the determining unit 403 determines that the contents of the data obtained by the first sensor 202 and the contents of the data obtained by the second sensor 202 are equivalent.

The control unit 405 may resume with respect to the data obtained by the second sensor 202, the transmission thereof by the second node, when the following condition is satisfied. The condition is a case where the determining unit 403 determines that the contents of the data obtained by the first sensor 202 and the contents of the data obtained by the second sensor 202 are not equivalent.

FIG. 5 is a diagram depicting an example of a list of signals transmitted by the nodes and the inspector terminal. Table 501 depicts a list of signals transmitted by the nodes and the inspector terminal 101. The nodes and the inspector terminal 101 transmit 13 types of signals. More specifically, signals used in creating groups include a group creation request and a group creation response (new). Signals used in changing groups include a group creation response (add), a member addition request, a group removal request, a group removal response, a member removal request, a proxy change request, a proxy change response, a group member ID list signal, and a proxy update request. Signals used in data collection include a data collection request and a data collection response.

A group creation request is a signal that is transmitted when a node does not belong to a group and variation of the data related to detection by the sensor 202 has exceeded a threshold. The transmission source of a group creation request is the node that has exceeded the threshold. The transmission destination of a group creation request is a nearby node. Data accompanying a group creation request includes the transmission source ID and the data related to detection by the sensor of the transmission source.

A group creation response (new) is a signal that is transmitted when a group creation request is received, the node does not belong to a group, and a difference between the data of the group creation request and the data of the recipient node is within a threshold. Herein, the difference of 2 data is assumed to be the absolute value of the difference of the 2 data. The transmission source of a group creation response (new) is the node that received the group creation request. The transmission destination of a group creation response (new) is the node that transmitted the group creation request. Data accompanying a group creation response (new) is the transmission source ID.

A group creation response (add) is a signal that is transmitted when a group creation request is received, the node does not belong to a group, and the difference between the data of the group creation request and the data of recipient node is within a given threshold. The transmission source of a group creation response (add) is the node that received the group creation request. The transmission destination of a group creation response (add) is the node that transmitted the group creation request. Data accompanying a group creation response (add) is the group proxy node ID.

A member addition request is a signal that is transmitted when a group creation response (add) has been transmitted. The transmission source of a member addition request is the node that transmitted the group creation response (add). The transmission destination of a member addition request is a group proxy node. Data accompanying a member addition request is the ID of the node that is to be added.

A group removal request is a signal that is transmitted when a node belongs to a group and variation of the data related to detection by the sensor has exceeded a threshold. The transmission source of a group removal request is the node that has exceeded the threshold. The transmission destination of a group removal request is a nearby node. Data accompanying a group removal request includes the transmission source ID and the data related to detection by the sensor of the transmission source.

A group removal response is a signal that is transmitted when a group removal request is received, the node belongs to a group, and the difference of the data of the group removal request and the data of the recipient node has exceeded a threshold. The transmission source of a group removal response is the node that received the group removal request. The transmission destination of a group removal response is the node that transmitted the group removal request. Data accompanying a group removal response is the group proxy node ID.

A member removal request is a signal that is transmitted when a group removal response has been transmitted. The transmission source of a member removal request is the node that transmitted the group removal response. The transmission destination of a member removal request is a group proxy node. Data accompanying a member removal request is the ID of the node that is to be deleted.

A data collection request is a signal that is transmitted when data is collected. The transmission source of a data collection request is the inspector terminal. The transmission destination of a data collection request is all of the nodes.

A data collection response is a signal that is transmitted by a node that has received a data collection request and, does not belong to a group or is a group proxy node. The transmission source of a data collection response is a node that does not belong to a group or a group proxy node. The transmission destination of a data collection response is a nearby node. Data accompanying a data collection response includes the transmission source ID, the group member IDs, and data related detection by the sensor of the transmission source.

A proxy change request is a signal that is transmitted when the transmitting node is a group proxy node and variation of the data related to detection by the sensor 202 thereof has exceeded a threshold. The transmission source of a proxy change request is the group proxy node that has exceeded the threshold. The transmission destination of a proxy change request is a nearby node. Data accompanying a proxy change request includes the transmission source ID and the data related to detection by the sensor of the transmission source. The transmission source ID is the same as the group proxy node ID.

A proxy change response is a signal that is transmitted when a proxy change request is received, the transmission source of the proxy change request is the group proxy node of the recipient node, and the difference of the data of the proxy change request and the data of the recipient node has exceeded a threshold. The transmission source of a proxy change response is the node that received the proxy change request. The transmission destination of a proxy change response is the node that transmitted the proxy change request. Data accompanying a proxy change response is the transmission source ID.

A group member ID list signal is a signal that is transmitted by a node that has received a proxy change response and is a group proxy node. The transmission source of a group member ID list signal is the group proxy node that received the proxy change response. The transmission destination of a group member ID list signal is the node that first sent the proxy change response. Data accompanying a group member ID list signal is the group member ID list.

A proxy update request is a signal that is transmitted by a node that has received a group member ID list signal and has become the new group proxy node. The transmission source of a proxy update request is the new group proxy node. The transmission destination of a proxy update request is the nodes of the same group. Data accompanying a proxy update request includes the former group proxy node ID and the new group proxy node ID. The new group proxy node ID is that same as the transmission source ID.

Configuration may include signals other than those depicted in FIG. 5. For example, the inspector terminal may transmit to all of the nodes, a signal to change a threshold. The nodes that receive the signal to change the threshold change the threshold accordingly.

An example of creating a group, adding a member to a group, deleting a member from a group, and changing the proxy node of a group using the signals depicted in FIG. 5 will be described with reference to FIGS. 6 to 16.

FIG. 6 is a diagram (part 1) depicting an example of group creation. The system 100 depicted in FIG. 6 includes nodes #1 to #9. Nodes near node #1 are assumed to be nodes #2 to #9. Further, data obtained by the sensor 202 of node ID#1 is assumed to be 15. Similarly, the data obtained by the respective sensors 202 of nodes #2 to #9 are assumed to be 17, 13, 11, 9, 12, 14, 18, and 21, respectively.

Node #1 compares the obtained data and the previous data and if the difference of the 2 data exceeds threshold A, node #1 notifies the nearby nodes. In this example, threshold A is assumed to be 4 and the previous data is assumed to be 10. Here, an average of past data may be used without comparison with the previous data. Further, node #1 may determine whether a ratio of the 2 data exceeds a threshold rather than the difference of the 2 data.

In the example depicted in FIG. 6, |15−10|=5>threshold A=4 and since the difference exceeds threshold A, node #1 transmits a group creation request to the nearby nodes #2 to #9. |x| represents the absolute value of x. Data accompanying the group creation request includes the transmission source ID: #1 and the data related to detection by the sensor 202 of the transmission source node #1: 15.

FIG. 7 is a diagram (part 2) depicting an example of group creation. FIG. 7 depicts the system 100 in a state after node #1 has transmitted the group creation request. Having received the group creation request, nodes #2 to #9 each determines that the contents of first data obtained by the sensor 202 thereof and the contents of second data obtained by the sensor 202 of node #1 and received from node #1 are equivalent when the difference of the first data and the second data is within threshold B. Here, threshold B is assumed to be 5.

For example, for node #2, |17−15|=2≤threshold B=5 and therefore, node #2 determines that the contents of the first and the second data are equivalent. Similarly, nodes #3, #4, and #6 to #8 also determine that the contents of the first and the second data are equivalent. Nodes #5 and #9 determine that the contents of the first and the second data are not equivalent since the difference of the first and the second data is greater than threshold B.

Nodes #2 to #4, and #6 to #8, which have determined that the contents of the first and the second data are equivalent, register information indicating membership in the same group as node #1 and transmit a group creation response (new) to node #1. The group creation response (new) is the ID of each transmission source node. Information indicating membership in the same group, for example, may be the ID of the group proxy node, which is the proxy of the group; or any value enabling groups to be uniquely identified. Further, the group proxy node may be any node provided the node is in the same group. In the present embodiment, node #1, which transmitted the group creation request, is assumed to be a group proxy node. Therefore, nodes #2 to #4 and #6 to #8 store to the non-volatile memory 206, the ID of node #1: #1 as the group proxy node.

Having received the group creation response (new), node #1 stores to the group member ID list in the non-volatile memory 206, the transmission source ID of the group creation response (new), as a member of the same group. In the example depicted in FIG. 7, node #1 stores to the group member ID list in the non-volatile memory 206, #2 to #4, #6 to #8 as members of the same group.

Figure 8:
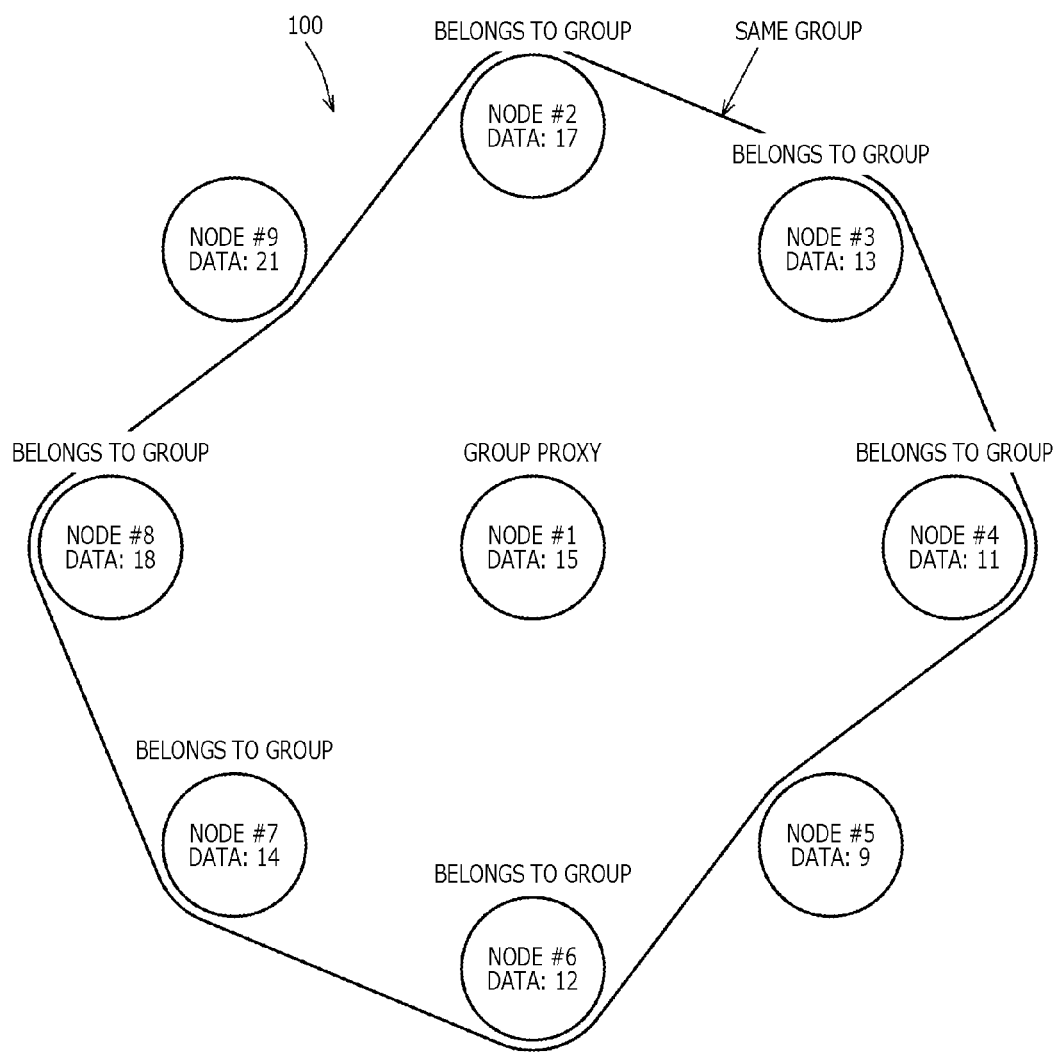
FIG. 8 is a diagram (part 3) depicting an example of group creation.

FIG. 8 is a diagram (part 3) depicting an example of group creation. FIG. 8 depicts the system 100 in a state after a group has been registered. As depicted in FIG. 8, nodes #1 to #4 and #6 to #8 are in the same group. Further, node #1 is the group proxy node and, nodes #2 to #4 and #6 to #8 are nodes belonging to the group.

Figure 9:
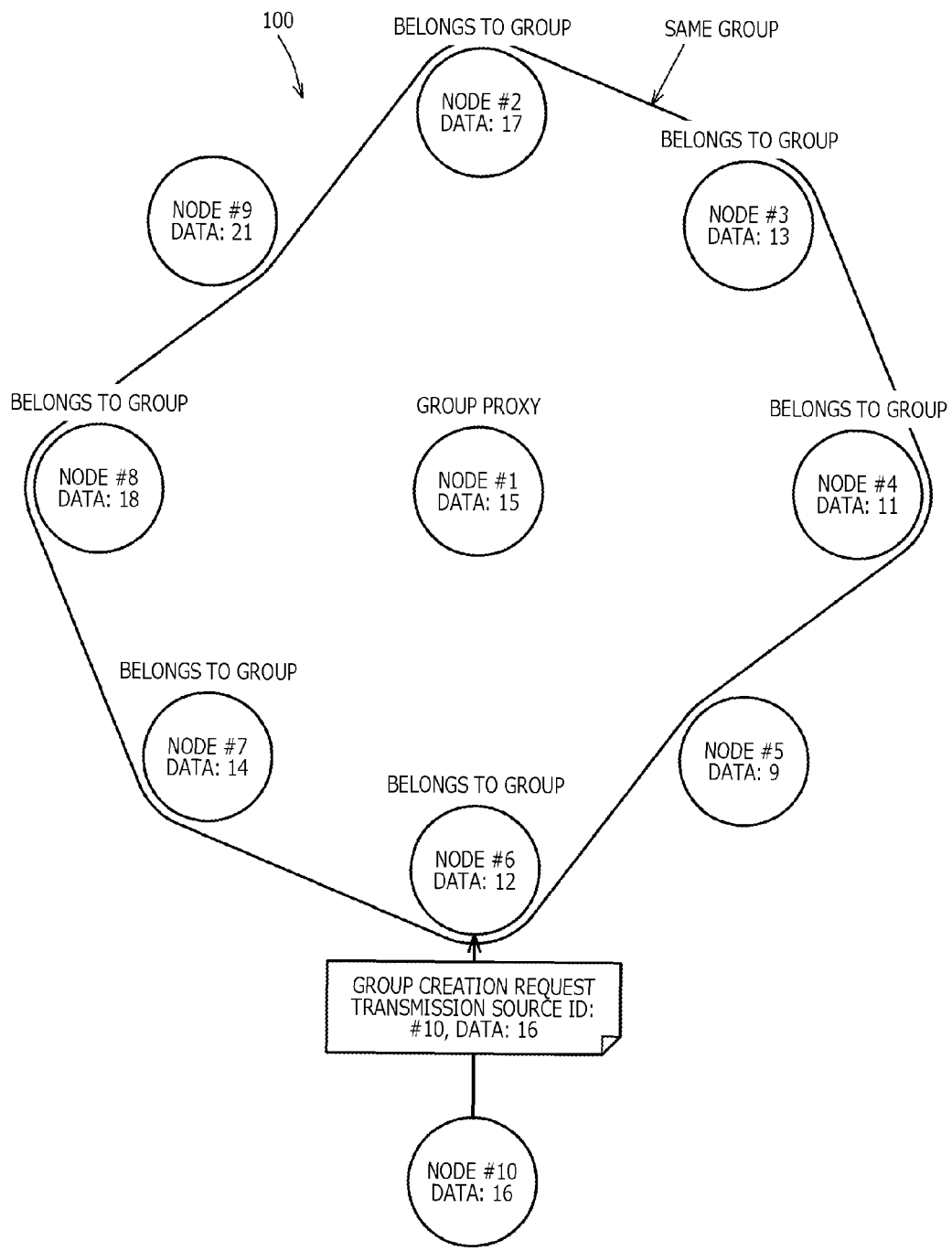
FIG. 9 is a diagram (part 1) depicting an example of member addition to a group.

FIG. 9 is a diagram (part 1) depicting an example of member addition to a group. The system 100 depicted in FIG. 9 includes node #10 and is in a state after nodes #1 to #4 and #6 to #8 have been grouped into the same group. Node #6 is assumed to be a nearby node of node #10. Further, node #10 does not belong to a group and the data obtained by the sensor 202 of node #10 is assumed to be 16.

Node #10 compares the obtained data and past data, and notifies nearby nodes if the difference exceeds threshold A. In this example, the difference is assumed to exceed threshold A and node #10 transmits a group creation request to the nearby node #6. Data accompanying the group creation request includes the transmission source ID: #10 and the data obtained by the sensor 202 of the transmission source node #10: 16.

Figure 10:
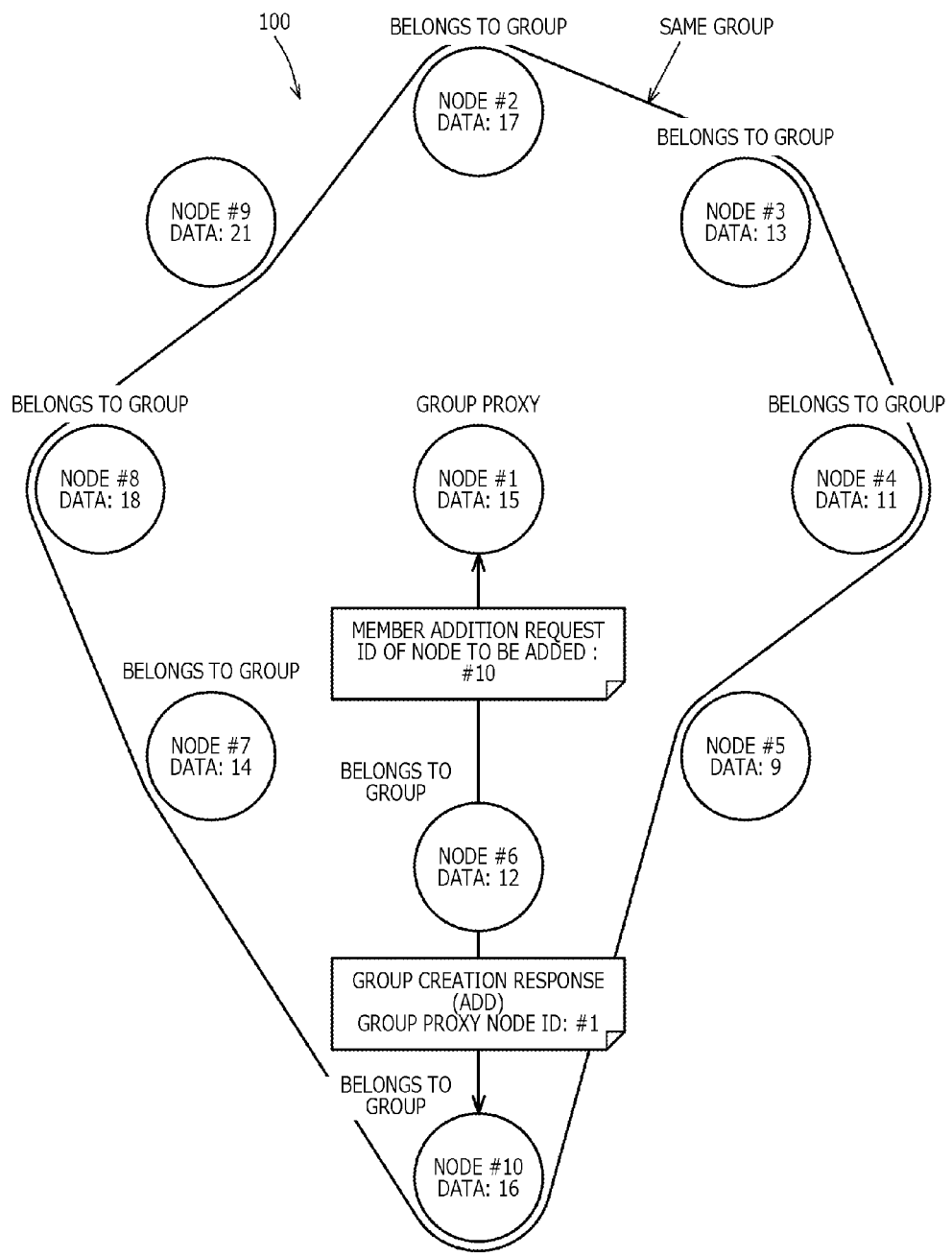
FIG. 10 is a diagram (part 2) depicting an example of member addition to a group.

FIG. 10 is a diagram (part 2) depicting an example of member addition to a group. FIG. 10 depicts the system 100 in a state after node #6 has received the group creation request. Node #6 compares the first data obtained by the sensor 202 of node #6 and the second data obtained by the sensor 202 of node #10, and determines whether the difference is within threshold B. More specifically, node #6 determines that the contents of the first and the second data are equivalent since |16−12|=4≤threshold B=5 is true.

If the contents of the first data and the second data are determined to be equivalent, node #10 is to be placed in the group to which node #6 belongs and therefore, node #6 transmits a group creation response (add) to node #10. Data accompanying the group creation response (add) is the group proxy node ID: #1. Having received the group creation response (add), node #10 stores to the non-volatile memory 206, the ID of node #1: #1, as the group proxy node.

Further, if the contents of the first and the second data are determined to be equivalent, the group proxy node is notified that node #10 is to be placed in the group to which node #6 belongs and therefore, node #6 transmits a member addition request to node #1, which is the group proxy node. Data accompanying the member addition request is the added node ID: #10. Having received the member addition request, node #1 stores to the non-volatile memory 206, #10 as a member of the same group. As a result, nodes #1 to #4, #6 to #8, and #10 are in the same group.

Figure 11:
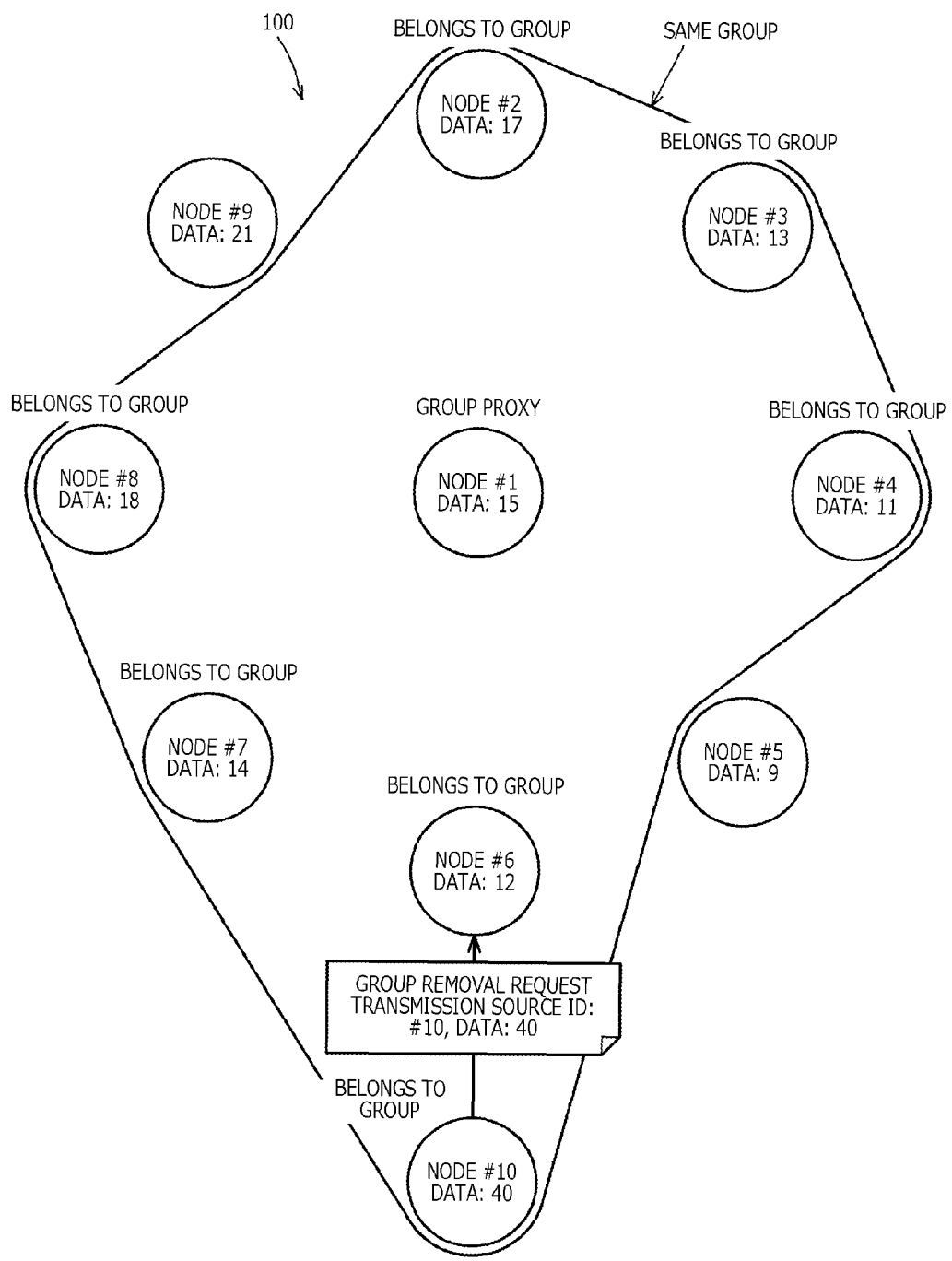
FIG. 11 is a diagram (part 1) depicting an example of member deletion from a group.

FIG. 11 is a diagram (part 1) depicting an example of member deletion from a group. The system 100 depicted in FIG. 11 is in state where node #10 has been added to the same group as nodes #1 to #4, and #6 to #8. Further, in FIG. 11, the data of node #10 has changed and become 40. In the example depicted in FIG. 11, since |40−16|=24>threshold A=4, node #10 detects that the data has changed.

If detecting that the data has changed, node #10 has to remove itself from group to which it currently belongs and transmits a group removal request to the nearby node #6. Data accompanying the group removal request includes the transmission source ID: #10 and the data detected by the sensor 202 of the transmission source: 40.

Figure 12:
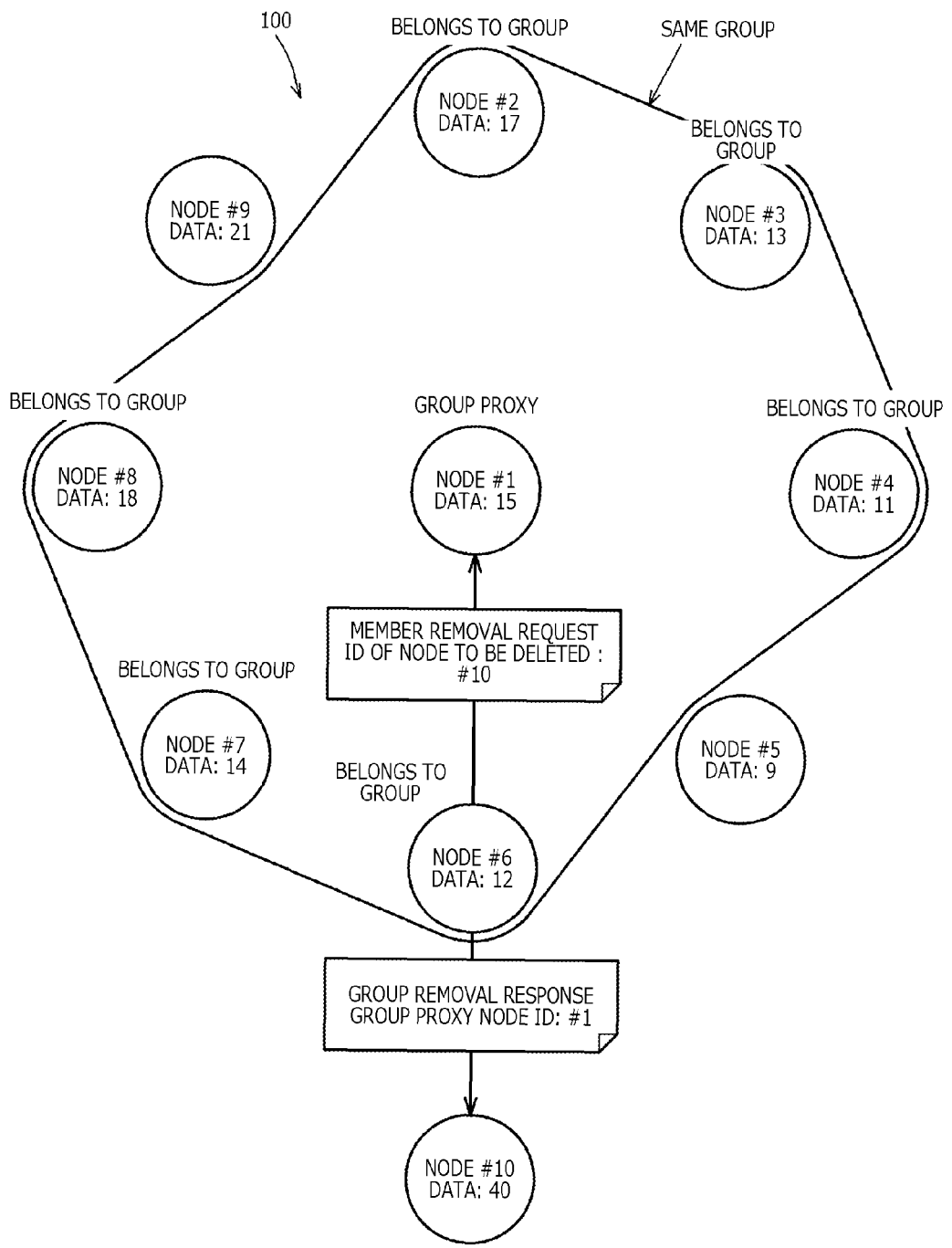
FIG. 12 is a diagram (part 2) depicting an example of member deletion from a group.

FIG. 12 is a diagram (part 2) depicting an example of member deletion from a group. In the system 100 depicted in FIG. 12, node #6 has received the group removal request. Node #6 compares the first data obtained by the sensor of node #6 and the second data obtained by the sensor 202 of node #10, and determines whether the difference is within threshold B. More specifically, node #6 determines that the contents of the first and the second data are not equivalent since |40−12|=28>threshold B=5 is true.

If determining that the contents of the first and the second data are not equivalent, node #6 transmits a group removal response to node #10 to remove node #10 from the group to which node #6 belongs. Data accompanying the group removal response is the group proxy node ID: #1. Having received the group removal response, node #10 erases the group proxy node in the non-volatile memory 206.

Further, when determining that the contents of the first and the second data are not equivalent, node #6 transmits a member removal request to node #1, which is the group proxy node, to remove node #10 from the group to which node #6 belongs. Data accompanying the member removal request is the ID of the node to be deleted: #10. Having received the member removal request, node #1 deletes from the group member ID list in the non-volatile memory 206, the ID of the node that is to be deleted according to the member removal request. As a result, nodes #1 to #4, and #6 to #8 are in the same group.

Figure 13:
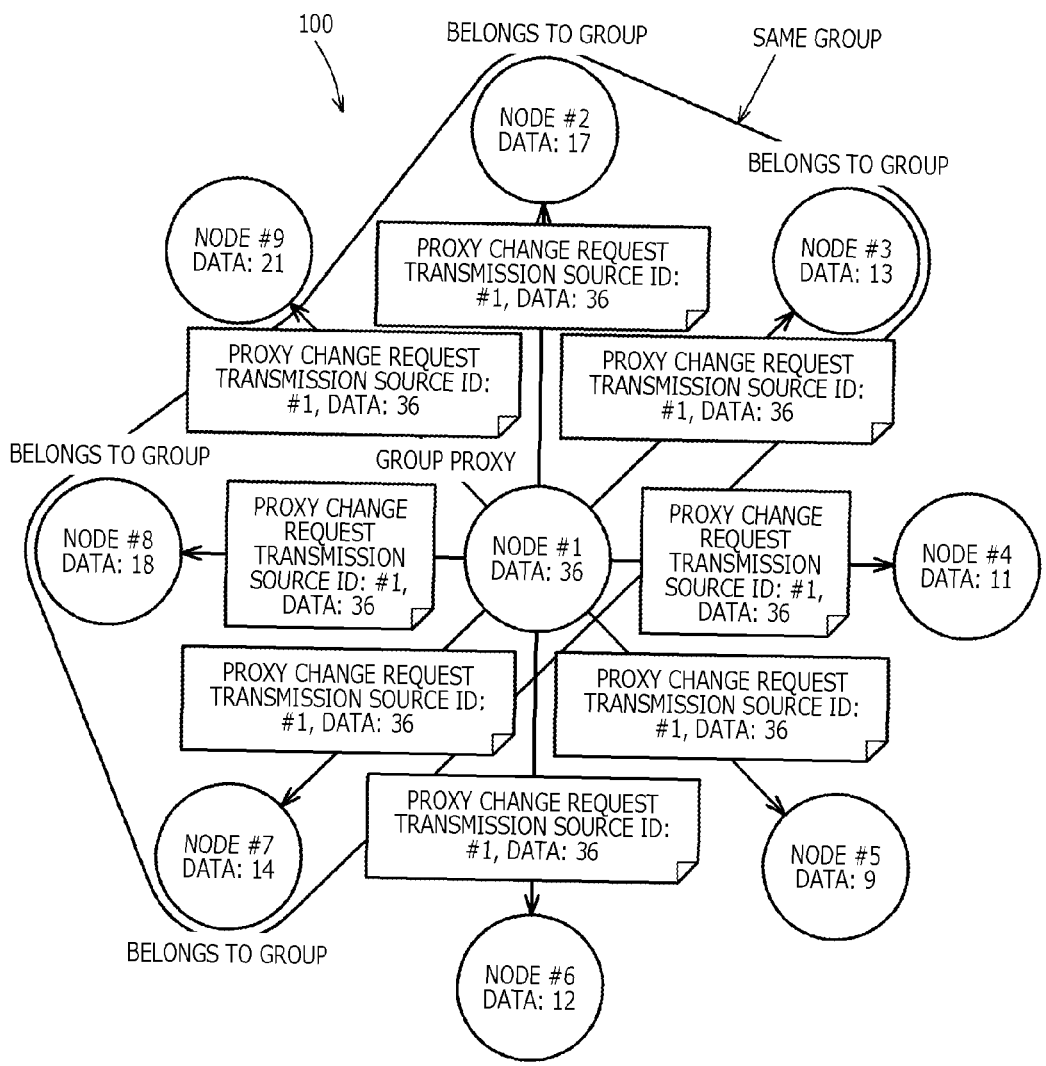
FIG. 13 is a diagram (part 1) depicting an example of changing a group proxy node.

FIG. 13 is a diagram (part 1) depicting an example of changing the group proxy node. The system 100 depicted in FIG. 13 is in a state where nodes #1 to #3, #7, and #8 are in the same group. Further, nodes near node ID#1 are nodes #2 to #9. In FIG. 13, the data of node #1 is assumed to have changed to become 36. In the example depicted in FIG. 13, since |36−15|=21>threshold A=4 is true, node #1 detects that the data has changed.

If detecting that the data has changed, node #1 has to change the group proxy node and transmits a proxy change request to the nearby nodes #2 to #9. Data accompanying the proxy change request includes the transmission source ID: #1 and the data related to the detection by the sensor of the transmission source node #1: 36.

Figure 14:
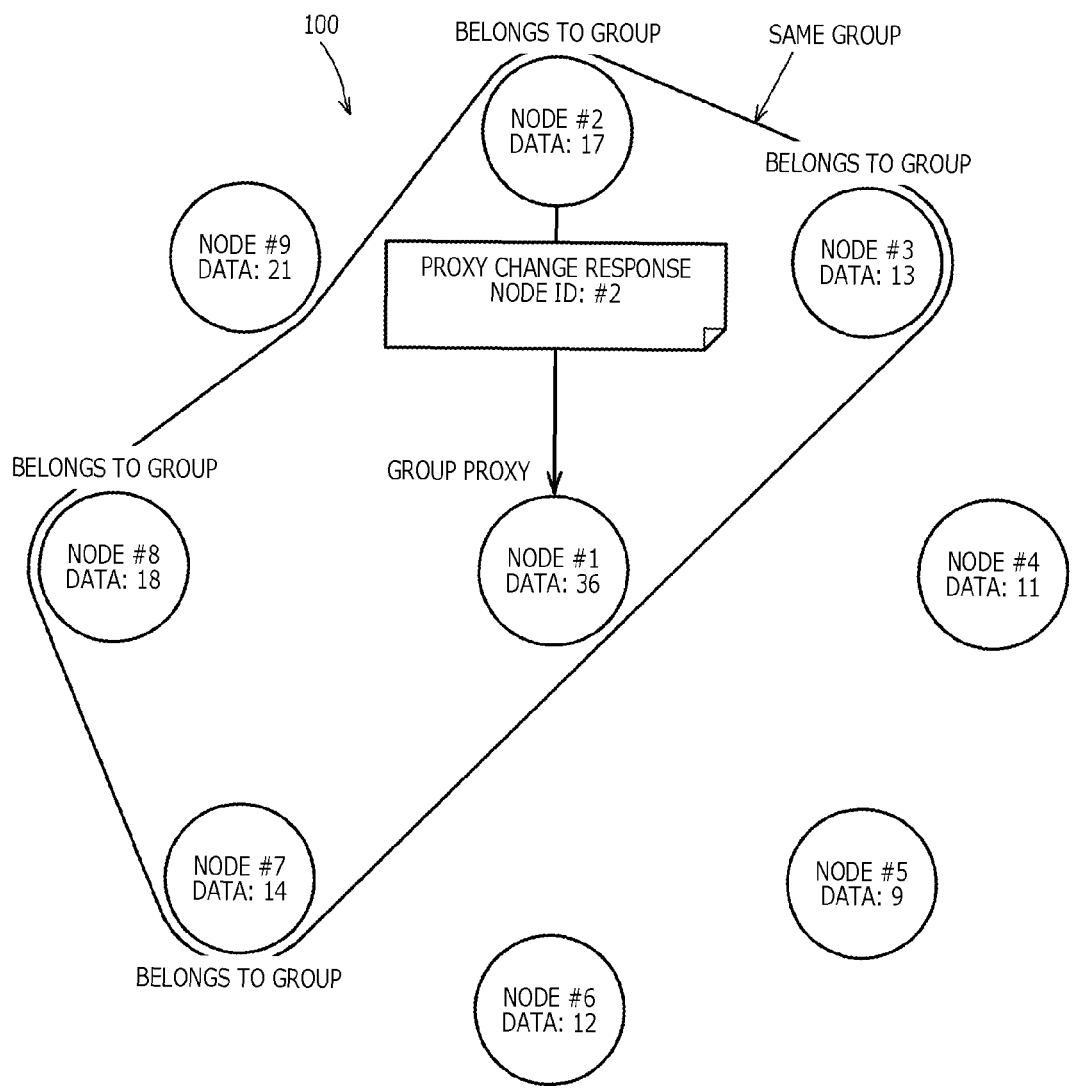
FIG. 14 is a diagram (part 2) depicting an example of changing the group proxy node.

FIG. 14 is a diagram (part 2) depicting an example of changing the group proxy node. FIG. 14 depicts the system 100 in state after node #1 has transmitted the proxy change request. Further, in the state depicted in FIG. 14, node #2 is assumed to first transmit to node #1, a proxy change response, which is a response to the proxy change request. Data accompanying the proxy change response is the transmission source ID: #2.

Although nodes #3, #7, and #8 also transmit a proxy change response to node #1, node #1 discards proxy change responses other than the first received proxy change response. Further, after receiving the proxy change request, nodes #4 to #6, and #9 discard the proxy change request as a request related to another group since the contents stored for the group proxy node in the non-volatile memory 206 does not match the transmission source ID of the proxy change request.

Figure 15:
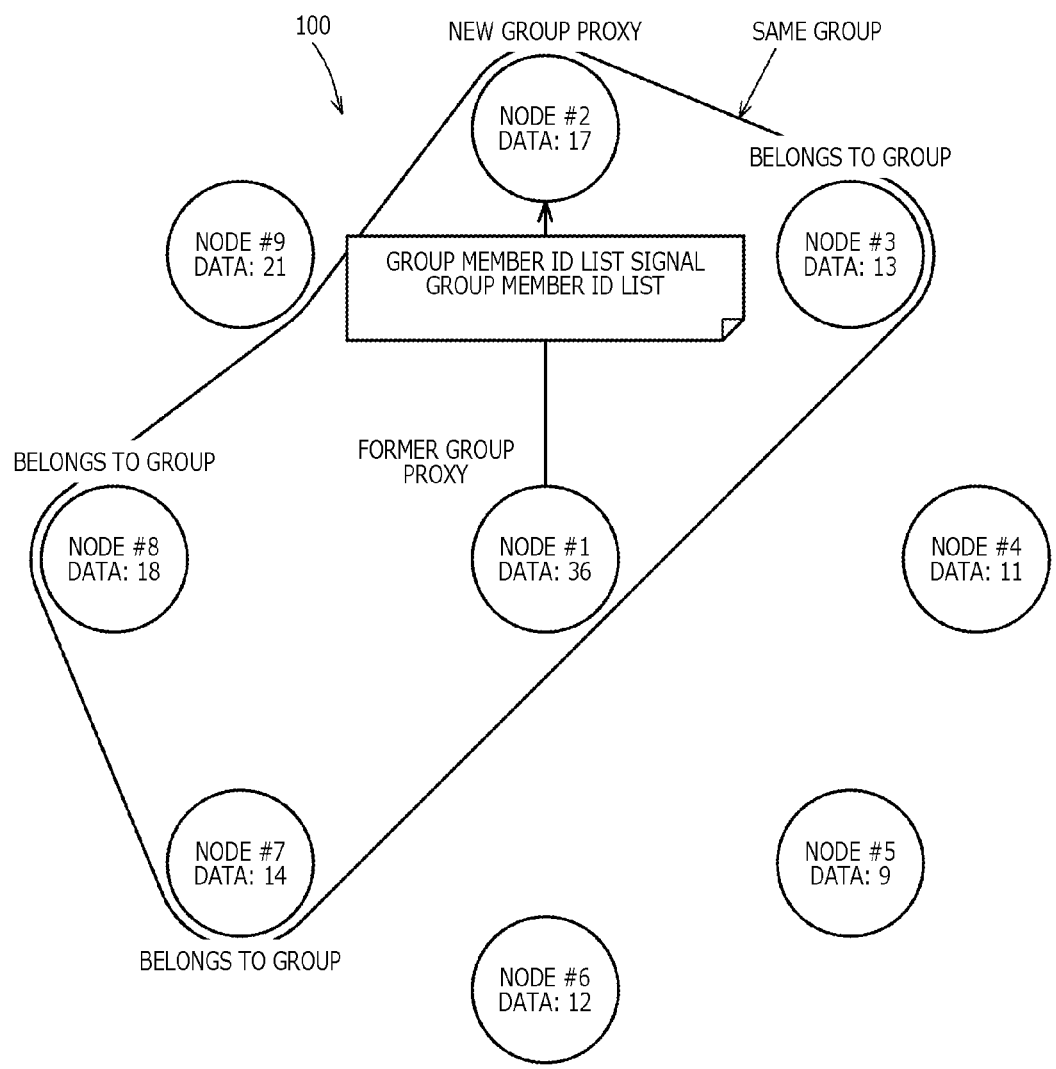
FIG. 15 is a diagram (part 3) depicting an example of changing the group proxy node.

FIG. 15 is a diagram (part 3) depicting an example of changing the group proxy node. FIG. 15 depicts the system 100 in a state after node #1 has received the proxy change response. Node #2 being the first to transmit a proxy change response, node #1 transmits to node #2, which is the new group proxy node, a group member ID list signal. Data accompanying the group member ID list signal is the group member ID list. The contents of the group member ID list depicted in FIG. 15 include #2, #3, #7, and #8.

Having received the group member ID list signal, node #2 removes the ID #2 thereof from the group member ID list of the group member ID list signal. Further, node #2 stores, as members belonging to the same group and excluding #2, which is the ID thereof, #3, #7, and #8 to the group member ID list in the non-volatile memory 206.

Figure 16:
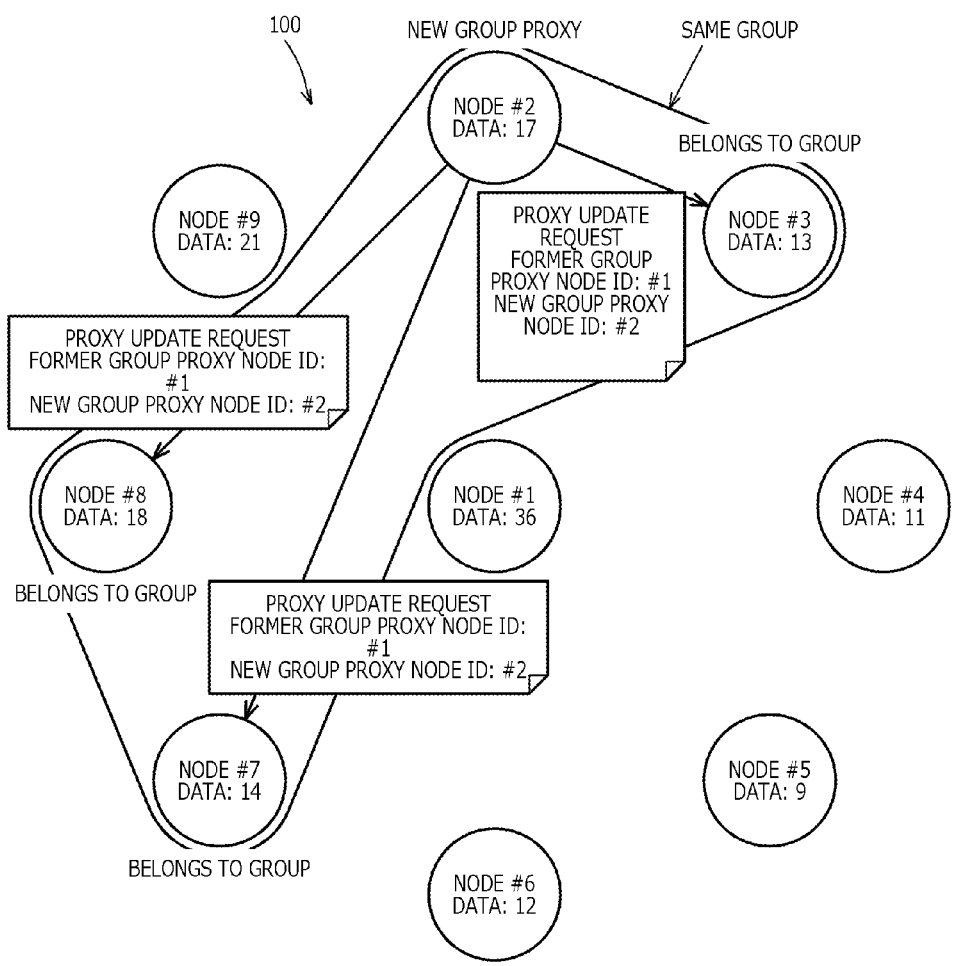
FIG. 16 is a diagram (part 4) depicting an example of changing the group proxy node.

FIG. 16 is a diagram (part 4) depicting an example of changing the group proxy node. FIG. 16 depicts the system 100 in a state after node #2 has received the group member ID list signal. Node #2, which has become the group proxy node, refers to the group member ID list in the non-volatile memory 206 and transmits a proxy update request to nodes #3, #7, and #8, which are in the same group. Data accompanying the proxy update request includes the former group proxy node ID: #1 and the new group proxy node ID: #2.

Having received the proxy update request, nodes #3, #7, and #8 compare the former group proxy node of the proxy update request and the group proxy node ID in the non-volatile memory 206 and if the IDs match, store the new group proxy node of the proxy update request as the group proxy node in the non-volatile memory 206.

The group creation, member addition to a group, member deletion from a group, and changing of a group proxy node described with reference to FIGS. 6 to 16 will be described with reference to sequence diagrams depicted in FIGS. 17 to 21. The system 100 depicted in FIGS. 17 to 21 includes node IDs #1 to #N.

Figure 17:
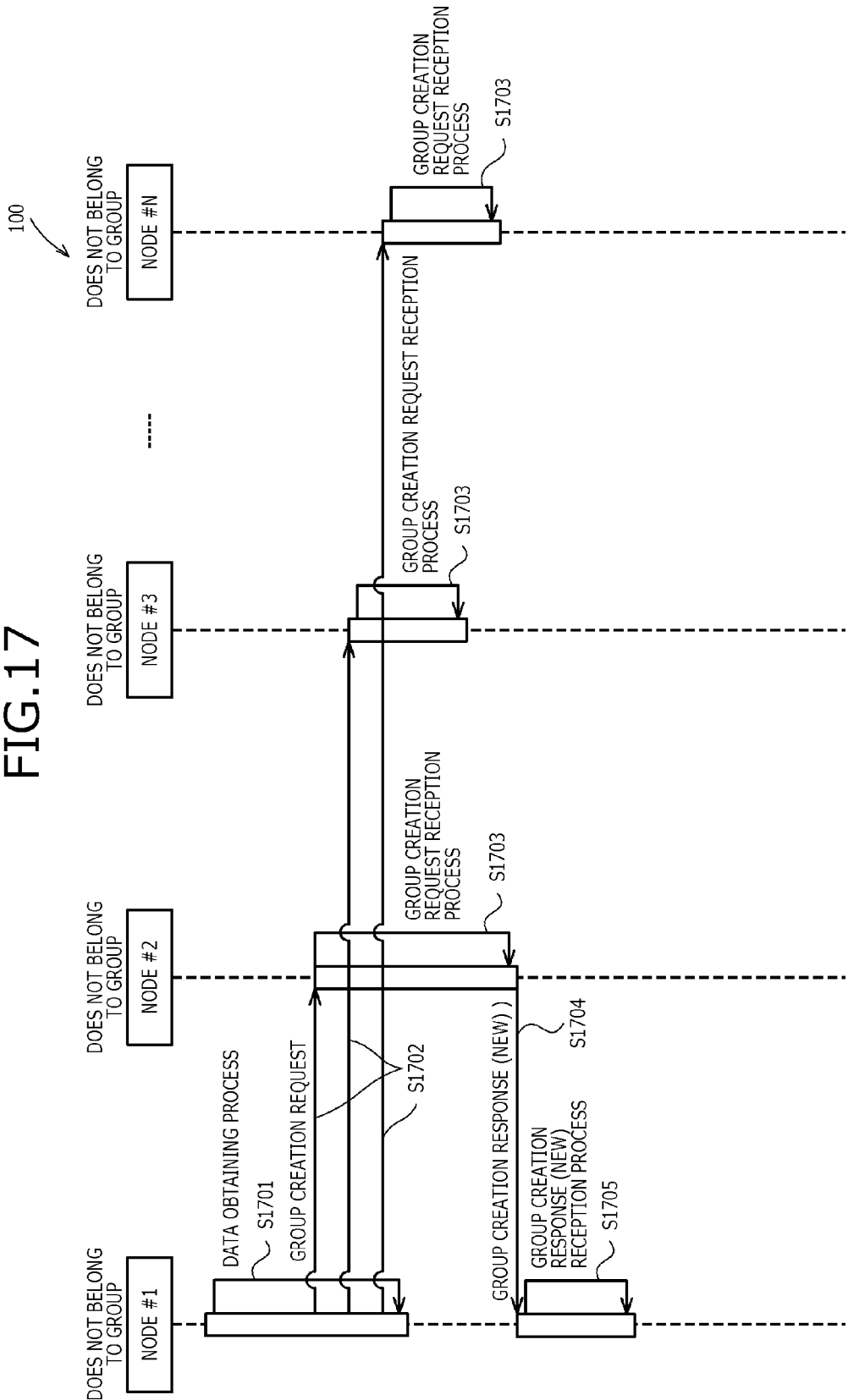
FIG. 17 is a sequence diagram depicting an example of group creation.

FIG. 17 is a sequence diagram depicting an example of group creation. Nodes #1 to #N depicted in FIG. 17 do not belong to a group. Further, nodes near node #1 are assumed to be nodes #2 to #N.

Node #1 executes a data obtaining process after sufficient charging (step S1701). Details of the data obtaining process will be described with reference to FIG. 22. Further, node #1 suffices to charge enough power to enable execution of the data obtaining process. In the example depicted in FIG. 17, the difference of the current data and the previous data is assumed to exceed threshold A and node #1 transmits a group creation request to the nearby nodes #2, #3, . . . , #N (step S1702).

Having received the group creation request, nodes #2, #3, . . . , #N execute a group creation request reception process (step S1703). Details of the group creation request reception process will be described with reference to FIG. 23. In the example depicted in FIG. 17, nodes #3, . . . , #N each compare the data related to detection by the sensor thereof and the data related to detection by the sensor 202 of the transmission source of the group creation request and since the difference is greater than threshold B, do not respond to the group creation request. On the other hand, since the difference of the data related to detection by the sensor 202 of node #2 and the data related to detection by the sensor 202 of the transmission source of the group creation request is within threshold B, node #2 transmits to node #1, a group creation response (new) for the group creation request (step S1704).

Having received the group creation request, node #1 executes group creation response (new) reception process (step S1705). Details of the group creation response (new) reception process will be described with reference to FIG. 25.

Figure 18:
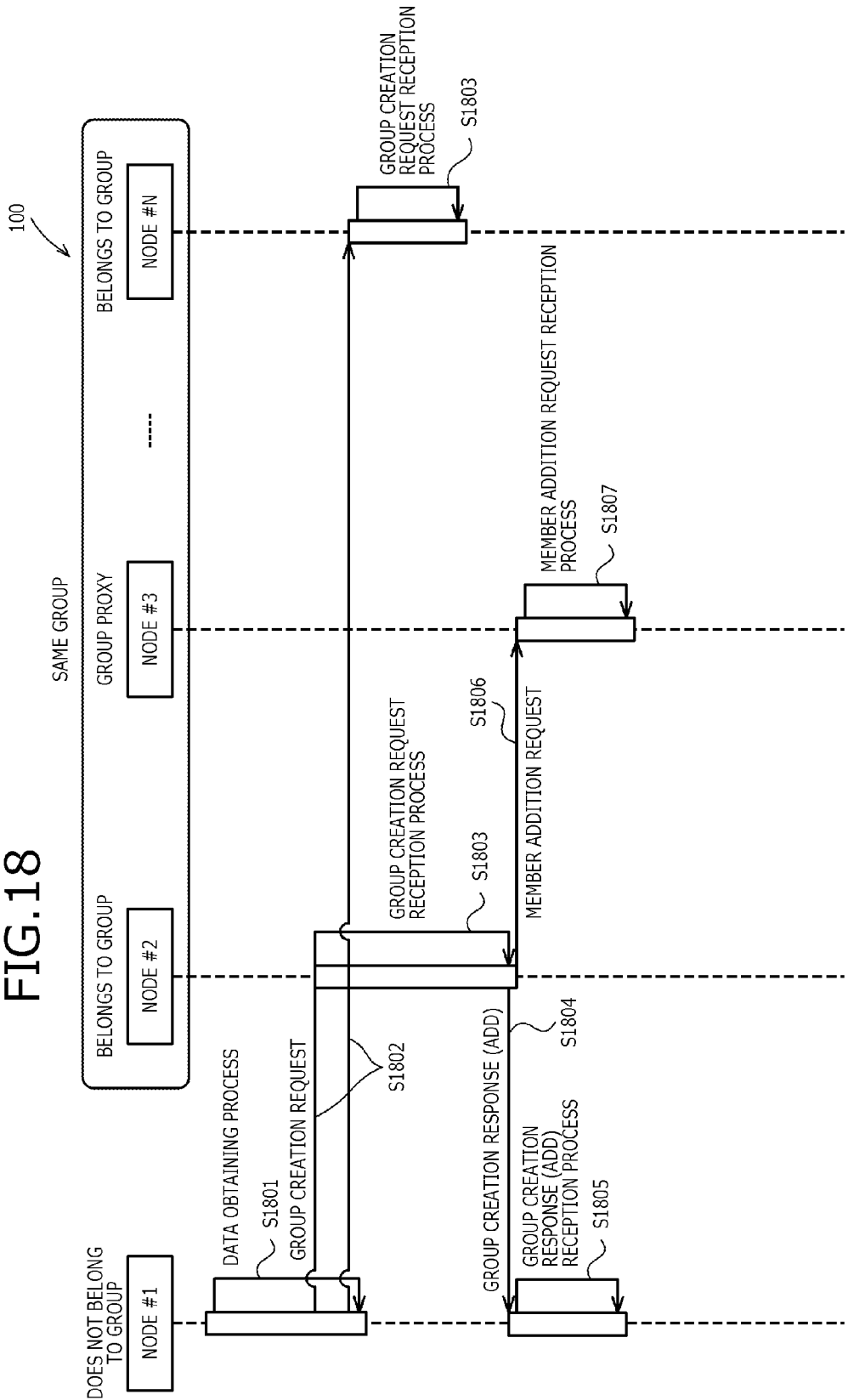
FIG. 18 is a sequence diagram depicting an example of member addition to a group.

FIG. 18 is a sequence diagram depicting an example of member addition to a group. Node #1 depicted in FIG. 18 does not belong to a group. Nodes #2 to #N belong to the same group and node #3 is the group proxy node of the group to which nodes #2 to #N belong. Further, the nodes near node #1 are assumed to be nodes #2 and #N.

After sufficient charging, node #1 executes the data obtaining process (step S1801). In the example depicted in FIG. 18, the difference of the current data and the previous data is assumed to exceed threshold A, and node #1 transmits a group creation request to the nearby nodes #2 and #N (step S1802).

Having received the group creation request, nodes #2 and #N execute the group creation request reception process (step S1803). In the example depicted in FIG. 18, since the difference of the data related to detection by the sensor 202 of the node #N and the data related to detection by the sensor 202 of the transmission source of the group creation request is greater than threshold B, node #N does not respond to the group creation request. On the other hand, since the difference of the data related to detection by the sensor 202 of node #2 and the data related to detection by the sensor 202 of the transmission source is within threshold B and node #2 belongs to a group, node #2 transmits to node #1, a group creation response (add) for the group creation request (step S1804).

Having received the group creation response (add), node #1 executes a group creation response (add) reception process (step S1805). Details of the group creation response (add) reception process will be described with reference to FIG. 26.

Further, in the group creation request reception process, node #2 transmits a member addition request to the group proxy node #3 (step S1806). Having received the member addition request, node #3 executes a member addition request reception process (step S1807). Details of the member addition request reception process will be described with reference to FIG. 27.

Figure 19:
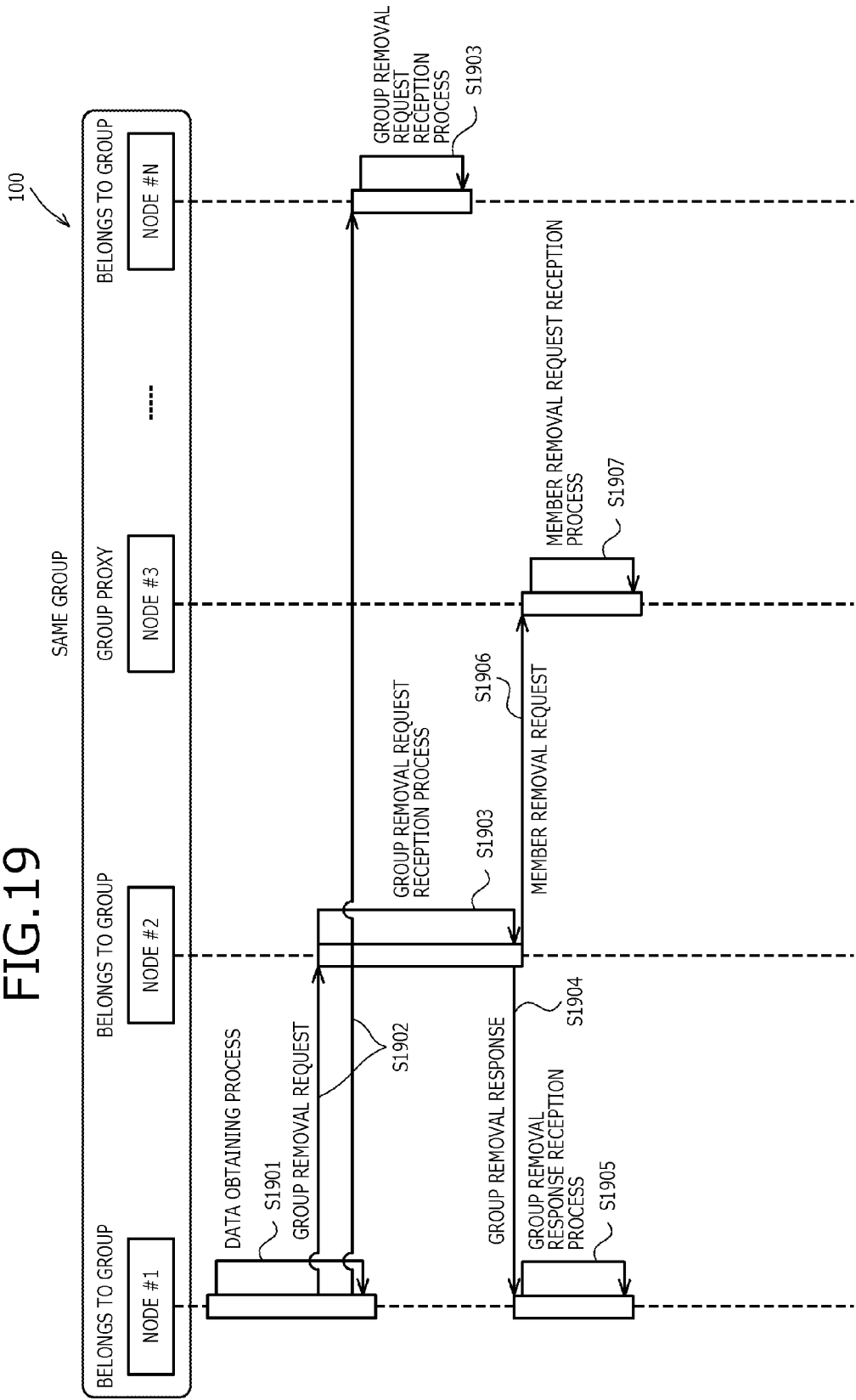
FIG. 19 is a sequence diagram depicting an example of member deletion from a group.

FIG. 19 is a sequence diagram depicting an example of member deletion from a group. Nodes #1 to #N depicted in FIG. 19 belong to the same group. Node #3 is the group proxy node of the group to which nodes #1 to #N belong. Further, the nodes near node #1 are assumed to be nodes #2 and #N.

After sufficient charging, node #1 executes the data obtaining process (step S1901). In the example depicted in FIG. 19, since the difference of the current data and the previous data exceeds threshold A and node #1 belongs to the group, node #1 transmits a group removal request to the nearby nodes #2 and #N (step S1902).

Having received the group removal request, nodes #2 and #N execute a group removal request reception process (step S1903). Details of the group removal request reception process will be described with reference to FIG. 24. Since the difference of the data related to detection by the sensor 202 of node #N and the data related to detection by the sensor 202 of the transmission source of the group creation request is within threshold B, node #N does not respond to the group removal request. On the other hand, since the difference of the data related to detection by the sensor 202 of node #2 and the data related to detection by the transmission source of the group creation request is greater than threshold B, node #2 transmits a group removal response to node #1 (step S1904).

Having received the group removal response, node #1 executes a group removal response reception process (step S1905). Details of the group removal response reception process will be described with reference to FIG. 28.

Further, in the group removal request reception process, node #2 transmits a member removal request to the group proxy node #3 (step S1906). Having received the member removal request, node #3 executes a member removal request reception process (step S1907). Details of the member removal request reception process will be described with reference to FIG. 29.

Figure 20:
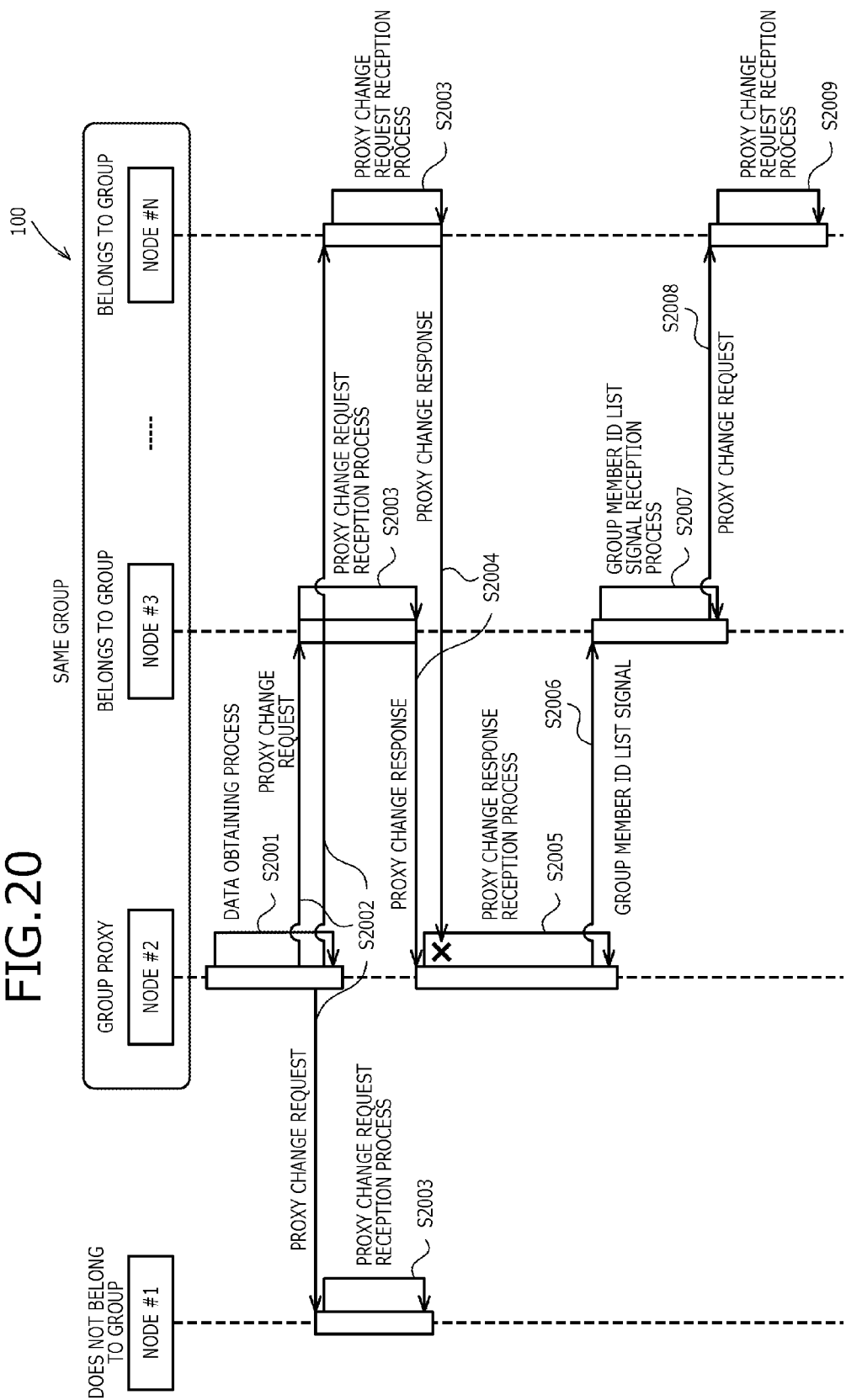
FIG. 20 is a sequence diagram depicting an example of changing the group proxy node.

FIG. 20 is a sequence diagram depicting an example of changing a group proxy node. Node #1 depicted in FIG. 20 does not belong to a group and nodes #2 to #N belong to the same group. Node #2 is the group proxy node of the group to which nodes #2 to #N belong. Further, the nodes near node #2 are assumed to be nodes #1, #3, and #N.

After sufficient charging, node #2 executes the data obtaining process (step S2001). In the example depicted in FIG. 20, the difference of the current data and the previous data is assumed to exceed threshold A and node #2 transmits a proxy change request to the nearby nodes #1, #3, and #N (step S2002).

Having received the proxy change request, nodes #1, #3, and #N execute a proxy change request reception process (step S2003). Details of the proxy change request reception process will be described with reference to FIG. 30. Since the transmission source ID of the received proxy change request and the proxy node ID in the non-volatile memory 206 differ, node #1 determines that the proxy change request is not related to node #1 and does not respond to the proxy change request. For nodes #3 and #N, since the transmission source ID of the received proxy change request and the proxy node ID in the non-volatile memory 206 match, nodes #3 and #N determine that the proxy change request relates to nodes #3 and #N and transmit to node #2, a proxy change response, which is a response to the proxy change request (step S2004). In the example depicted in FIG. 20, node #3 is assumed to have transmitted the proxy change response before node #N.

Having received the proxy change response from node #3, node #2 executes a proxy change response reception process (step S2005). Details of the proxy change response reception process will be described with reference to FIG. 31. In the proxy change response reception process, node #2 transmits a group member ID list signal to node #3, which is the new group proxy node (step S2006).

Having received the group member ID list signal, node #3 executes a group member ID list signal reception process (step S2007). Details of the group member ID list signal reception process will be described with reference to FIG. 32. In the group member ID list signal reception process, node #3 transmits a proxy change request to node #N, which belongs to the same group (step S2008). Having received the proxy change request, node #N executes the proxy change request reception process (step S2009). Details of the proxy change request reception process will be described with reference to FIG. 33.

Figure 21:
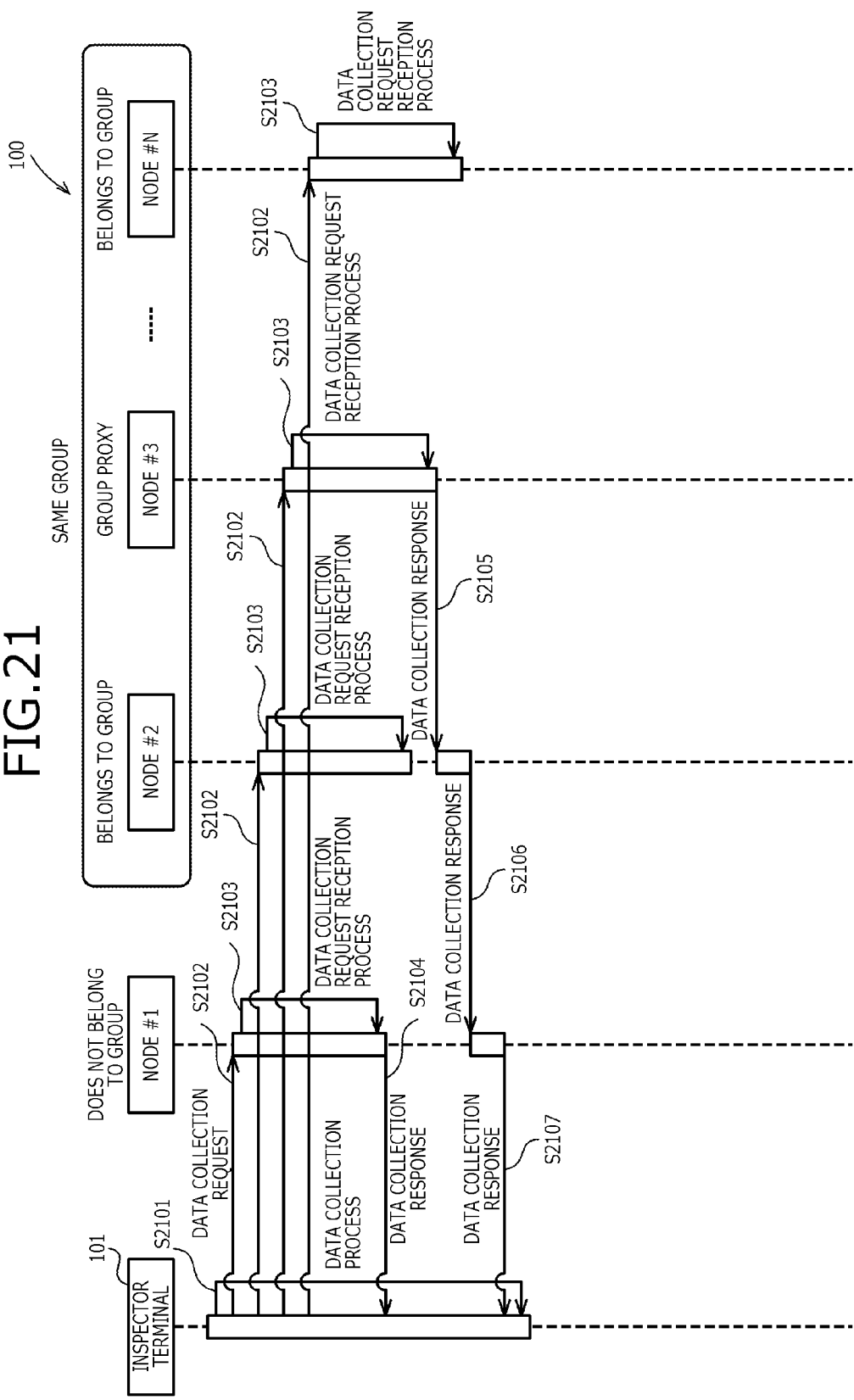
FIG. 21 is a sequence diagram depicting an example of operation when data is collected.

FIG. 21 is a sequence diagram depicting an example of operation when data is collected. Node #1 depicted in FIG. 21 does not belong to a group. Nodes #2 to #N belong to the same group and node #3 is the group proxy node of the group to which nodes #2 to #N belong. Further, apparatuses near node #1 are assumed to be the inspector terminal 101 and node #2. Apparatuses near node #2 are assumed to be nodes #1 and #N; and the apparatus near node #3 is assumed to be node #2.

The inspector terminal 101 executes a data collection request process consequent to an instruction, etc. by user operation of the inspector terminal 101 (step S2101). The data collection request process is one part of a data collection process depicted in FIG. 34. The data collection request process will be described with reference to FIG. 34. In data collection request process, the inspector terminal 101 transmits a data collection request to nodes #1 to #3 and #N (step S2102). Having received the data collection request, nodes #1 to #3 and #N execute a data collection request reception process (step S2103). The data collection request reception process is one part of the data collection process depicted in FIG. 34. The data collection request reception process will be described with reference to FIG. 34.

Since node #1 does not belong to a group, in the data collection request reception process, node #1 transmits to nearby apparatuses, a data collection response that includes the data related to detection by the sensor 202 of node #1 (step S2104). In the example depicted in FIG. 21, since the inspector terminal 101 and node #2 are apparatuses near node #1, node #1 transmits to the inspector terminal 101 and node #2, the data related to detection by the sensor 202 of node #1. In FIG. 21, depiction of the transmission to node #2 is omitted. By these operations, the inspector terminal 101 is able to collect data related to detection by the sensor 202 of node #1.

Further, since nodes #2 and #N belong to the same group and are not the group proxy, in the data collection request reception process, nodes #2 and #N do not transmit to nearby apparatuses, the data related to detection by the sensors 202 respectively of nodes #2 and #N.

On the other hand, since node #3 is the group proxy, in the data collection request reception process, node #3 transmits to nearby apparatuses, a data collection response that includes the data related to detection by the sensor 202 of node #3 (step S2105). In the example depicted in FIG. 21, since node #2 is an apparatus near node #3, node #3 transmits the data collection response to node #2. Having received the data collection response from node #3, node #2 transfers the received data collection response to nearby apparatuses (step S2106). In the example depicted in FIG. 21, since nodes #1 and #3 are apparatuses near node #2 and node #3 is the transfer source of the data collection response, node #2 transfers the data collection response to node #1.

Having received the data collection response from node #2, node #1 transfers the received data collection response to nearby apparatuses (step S2107). In the example depicted in FIG. 21, since the inspector terminal 101 and node #2 are apparatuses near node #1 and node #2 is the transfer source of the data collection response, node #1 transfers the data collection response to the inspector terminal 101. By these operations, the inspector terminal 101 is able to collect data related to detection by the sensor 202 of node #3, which is the proxy of the group to which nodes #2, #3, and #N belong.

Flowcharts of the processes described with reference to the sequence diagrams depicted in FIGS. 17 to 21 will be described with reference to FIGS. 22 to 34.

FIG. 22 is a flowchart of a procedure of the data obtaining process. The data obtaining process is a process of receiving data obtained by the sensor 202 and transmitting a signal to another node according an obtained result. Further, the data obtaining process is executed by each of the nodes.

A node obtains data related to detection by the sensor (step S2201). The node determines if the difference of the obtained data and the previous data is greater than or equal to threshold A (step S2202). If the difference of the obtained data and the previous data is greater than or equal to threshold A (step S2202: YES), the node determines whether the node is a proxy node (step S2203). More specifically, the node determines that the node is a proxy node if the value of the proxy node ID stored in the non-volatile memory 206 of the node is the ID of the node.

If the node is not a proxy node (step S2203: NO), the node determines whether the node belongs to a group (step S2204). If the node does not belong to a group (step S2204: NO), the node transmits a group creation request to nearby nodes (step S2205).

If the node belongs to a group (step S2204: YES), the node transmits a group removal request to nearby nodes (step S2206). If the node is a proxy node (step S2203: YES), the node transmits a proxy change request to nearby nodes (step S2207). If the difference of the obtained data and the previous data is not greater than or equal to threshold A (step S2202: NO) or after completing the operations at any one of steps S2205 to S2207, the node ends the data obtaining process. By executing the data obtaining process, the node can detect triggers for creation of a group, removal from a group, and proxy changing when the node is a group proxy node.

FIG. 23 is a flowchart of a procedure of the group creation request reception process. The group creation request reception process is a process performed when a group creation request has been received. The group creation request reception process is executed by a node that has received a group creation request and since a group creation request is transmitted to nearby nodes, in actuality, the group creation request reception process can be executed by any node.

Consequent to the operation at step S2205, when a group creation request has been received by a node, the node obtains data related to detection by the sensor 202 (step S2301). The node determines whether the difference of the obtained data and the data in the group creation request is within threshold B (step S2302). If the difference of the obtained data and the data in the group creation request is within threshold B (step S2302: YES), the node determines whether the node belongs to a group (step S2303).

If the node does not belong to a group (step S2303: NO), the node transmits a group creation response (new) to the node that transmitted the group creation request (step S2304). The node records the transmission source ID of the group creation request to the non-volatile memory 206, as the group proxy node ID (step S2305). The node may execute the operation at step S2305 before the operation at step S2304.

If the node belongs to a group (step S2303: YES), the node transmits a group creation response (add) to the node that transmitted the group creation request (step S2306). The node transmits a member addition request to the group proxy node (step S2307). The node may execute the operation at step S2307 before the operation at step S2306.

If the difference of the obtained data and the data in the group creation request is not within threshold B (step S2302: NO), after completing the operation at step S2305 or after completing the operation at step S2307, the node ends the group creation request reception process. By executing the group creation request reception process, the node can set to be in the same group, a node whose value of the sensor 202 has become similar.

FIG. 24 is a flowchart of a procedure of the group removal request reception process. The group removal request reception process is a process performed when a group removal request has been received. The group removal request reception process is executed by a node that has received a group removal request and since a group removal request is transmitted to nearby nodes, in actuality, the group removal request reception process can be executed by any node.

Consequent to the operation at step S2206, when a group removal request has been received by a node, the node determines whether the node belongs to a group (step S2401). If the node belongs to a group (step S2401: YES), the node obtains data related to detection by the sensor 202 (step S2402). The node determines whether the difference of the obtained data and the data in the group removal request is greater than threshold B (step S2403).

If the difference of the obtained data and the data in the group removal request is greater than threshold B (step S2403: YES), the node transmits a group removal response to the transmission source of the group removal request (step S2404). The node transmits a member removal request to the proxy node (step S2405). The node may execute the operation at step S2405 before the operation at step S2404.

If the node does not belong to a group (step S2401: NO), the difference of the obtained data and the data in the group removal request is within threshold B (step S2403: NO), or after execution of the operation at step S2405, the node ends the group removal request reception process. By executing the group removal request reception process, the node can remove from the same group, a node whose data of the sensor 202 has deviated from the group.

FIG. 25 is a flowchart of a procedure of the group creation response (new) reception process. The group creation response (new) reception process is a process performed when a group creation response (new) has been received. The group creation response (new) reception process is executed by a node that has transmitted a group creation request.

Consequent to the operation at step S2304, when a group creation response (new) is received by a node, the node adds the transmission source ID of the group creation response (new) to the group member ID list in the non-volatile memory 206 (step S2501). The node registers the ID thereof as the group proxy node ID in the non-volatile memory 206 (step S2502). After executing step S2502, the node ends the group creation response (new) reception process. By executing the group creation response (new) reception process, the node can create a group by the sensors 202 whose data are similar.

FIG. 26 is a flowchart of a procedure of the group creation response (add) reception process. The group creation response (add) reception process is a process performed when a group creation response (add) has been received. The group creation response (add) reception process is executed by a node that has transmitted a group creation request.

Consequent to the operation at step S2306, when a group creation response (add) has been received by a node, the node registers as the group proxy node ID in the non-volatile memory 206, the group proxy node ID in the group creation response (add) (step S2601). After executing the operation at step S2601, the node ends the group creation response (add) reception process. By executing the group creation response (add) reception process, the node can be added to a group created based on the sensors 202 whose data are similar.

FIG. 27 is a flowchart of a procedure of the member addition request reception process. The member addition request reception process is a process performed when a member addition request has been received. The member addition request reception process is executed by a group proxy node. Therefore, in the description of FIG. 27, the executing agent is a group proxy node.

Consequent to the operation at step S2307, when a member addition request has been received, the group proxy node registers to the group member ID list in the non-volatile memory 206, the ID of the node that is to be added as indicated in the member addition request (step S2701). After executing step S2701, the group proxy node ends the member addition request reception process. By executing the member addition request reception process, the group proxy node can add to the group, a node whose data of the sensor 202 is similar.

FIG. 28 is a flowchart of a procedure of the group removal response reception process. The group removal response reception process is a process performed when a group removal response has been received. The group removal response reception process is executed by a node that has transmitted a group removal request.

Consequent to the operation at step S2404, when a group removal response has been received by a node, the node obtains the proxy node ID from the non-volatile memory 206 (step S2801). The node determines whether the proxy node ID in the received group removal response and the proxy node ID in the non-volatile memory 206 match (step S2802).

If the proxy node ID in the group removal response and the proxy node ID in the non-volatile memory 206 match (step S2802: YES), the node erases the proxy node ID in the non-volatile memory 206 (step S2803). After executing step S2803 or if the proxy node ID in the group removal response and the proxy node ID in the non-volatile memory 206 do not match (step S2802: NO), the node ends the group removal response reception process. By executing the group removal response reception process, the node can be removed from the group if the data of the sensor 202 has changed.

FIG. 29 is a flowchart of a procedure of the member removal request reception process. The member removal request reception process is a process performed when a member removal request has been received. The member removal request reception process is executed by a group proxy node. Therefore, in the description of FIG. 29, the executing agent is a group proxy node.

Consequent to the operation at step S2405, when a member removal request has been received, the group proxy node deletes from the group member ID list in the non-volatile memory 206, the ID of the node that is to be deleted as indicated in the member removal request (step S2901). After executing step S2901, the group proxy node ends the member removal request reception process. By executing the member removal request reception process, the group proxy node can remove from the group, a node whose data of the sensor 202 has changed.

FIG. 30 is a flowchart of a procedure of the proxy change request reception process. The proxy change request reception process is a process performed when a proxy change request has been received. The proxy change request reception process is executed by a node that has received a proxy change request and since a group proxy node that transmits a proxy change request transmits the proxy change request to nearby nodes, in actuality, any node can execute the proxy change request reception process.

Consequent to the operation step S2207, when a proxy change request has been received by a node, the node obtains the group proxy node ID from the non-volatile memory 206 (step S3001). The node determines whether the transmission source ID of the received proxy change request and the group proxy node ID of the non-volatile memory 206 match (step S3002). If the transmission source ID of the received proxy change request and the group proxy node ID in the non-volatile memory 206 match (step S3002: YES), the node obtains data related to detection by the sensor 202 (step S3003). The node determines whether the difference of the obtained data and the data in the proxy change request is greater than threshold B (step S3004). If the difference of the obtained data and the data in the proxy change request is greater than threshold B (step S3004: YES), the node transmits a proxy change response to the former proxy node, which is the transmission source of the proxy change request (step S3005).

After executing step S3005, if the transmission source ID in the proxy change request and the group proxy node ID in the non-volatile memory 206 do not match (step S3002: NO), or if the difference of the obtained data and the data in the proxy change request is within threshold B (step S3004: NO), the node ends the proxy change request reception process. By executing the proxy change request reception process, the node that can become the new group proxy node when the data of the sensor 202 of the group proxy node has changed can give notification as the group proxy node.

FIG. 31 is a flowchart of a procedure of the proxy change response reception process. The proxy change response reception process is a process performed when a proxy change response has been received. The proxy change response reception process is executed by a former group proxy node that has transmitted a proxy change request. Therefore, in the description of FIG. 31, the executing agent is a former group proxy node.

Consequent to the operation at step S3005, when a proxy change response has been received, the former group proxy node determines whether the proxy change response is the first to be received (step S3101). If the proxy change response is the first to be received (step S3101: YES), the former group proxy node transmits a group member ID list signal to the transmission source of the proxy change response (step S3102).

The former group proxy node erases the group member ID list in the non-volatile memory 206 (step S3103). The former group proxy node further erases the group proxy node ID in the non-volatile memory 206 (step S3104). The former group proxy node may execute the operation at step S3104 before the operation at step S3103.

After executing step S3104, or if the proxy change response is the second or subsequent to be received (step S3101: NO), the group proxy node ends the proxy change response reception process. By executing the proxy change response reception process, the former group proxy node can let the ID of a node belonging to the group succeed as the new group proxy node.

FIG. 32 is a flowchart of a procedure of the group member ID list signal reception process. The group member ID list signal reception process is a process performed when a group member ID list signal has been received. The group member ID list signal reception process is executed by a new group proxy node that has received a group member ID list signal. Therefore, in the description of FIG. 32, the executing agent is a new group proxy node.

Consequent to the operation at step S3102, when a group member ID list signal has been received, the new group proxy node registers the group member ID list of the received group member ID list signal as the group member ID list in the non-volatile memory 206 (step S3201). The new group proxy node registers the ID thereof as the group proxy node ID in the non-volatile memory 206 (step S3202). The new group proxy node transmits a proxy update request to group member nodes (step S3203). After executing step S3203, the new group proxy node ends the group member ID list signal reception process. By executing the group member ID list signal reception process, the new group proxy node can give notification of the ID thereof as the new group proxy node, to the nodes belonging to the same group.

FIG. 33 is a flowchart of a procedure of a proxy update request reception process. The proxy update request reception process is a process performed when a proxy update request has been received. The proxy update request reception process is executed by nodes belonging to a group.

Consequent to the operation at step S3203, when a proxy update request is received by a node, the node obtains the group proxy node ID from the non-volatile memory 206 (step S3301). The node determines whether the former proxy node ID in the received proxy update request matches the group proxy node ID in the non-volatile memory 206 (step S3302). If the former proxy node ID in the received proxy update request matches the group proxy node ID in the non-volatile memory 206 (step S3302: YES), the node registers as the group proxy node ID in the non-volatile memory 206, the new proxy node ID in the received proxy update request (step S3303).

After executing step S3303, or if the former proxy ID in the received proxy update request does not match the group proxy node ID in the non-volatile memory 206 (step S3302: NO), the node ends the proxy update request reception process. By executing the proxy update request reception process, the nodes belonging to the group can recognize the ID of the new group proxy node as the group proxy node.

FIG. 34 is a flowchart of a procedure of the data collection process. The data collection process is a process of collecting data of the sensors 202 in the system 100. The data collection process includes a process performed by the inspector terminal 101 and a process performed by nodes. The process performed by the inspector terminal 101 is regarded as the data collection request process. Meanwhile, the process performed by the nodes is regarded as the data collection request reception process.

The inspector terminal 101 transmits a data collection request to each of the nodes (step S3401). The inspector terminal 101 stands by for a given period (step S3402). When the wireless communications circuit 311 is a communications circuit that uses short-range radio waves, the inspector terminal 101 transmits the data collection request to the nodes by multihop communication.

Each node receives the data collection request (step S3403). Each node determines whether the node is a group proxy node (step S3404). If the node is not a group proxy node (step S3404: NO), the node determines whether the node belongs to a group (step S3405). If the node belongs to a group (step S3405: YES), the node ends the data collection request reception process.

If the node is a group proxy node (step S3404: YES), or if the node does not belong to a group (step S3405: NO), the node transmits a data collection response to nearby nodes (step S3406). After executing step S3406, the node ends the data collection request reception process. Nodes that have received the data collection response transfer the data collection response to nearby nodes.

The inspector terminal 101 receives the data collection response (step S3407). The inspector terminal 101 determines whether a given volume of data could be collected (step S3408). The given volume of data is specified by the manager of the system 100. For example, the given volume of data is 80[%] of the total data. If the given volume of data has been collected (step S3408: YES), the inspector terminal 101 outputs normal completion (step S3409). If the given volume of data has not been collected (step S3408: NO), the inspector terminal 101 outputs abnormal completion (step S3410). After executing step S3409 or after executing step S3410, the inspector terminal 101 ends the data collection request process. By executing the data collection process, the inspector terminal 101 can collect the data of the sensors 202.

As described, the system 100 suspends transmission of the data obtained by the second sensor 202 if the contents of the data obtained from the first sensor 202 of the first node and the contents of the data obtained from the second sensor 202 of the second node are equivalent. As a result, the system 100 reduces the volume of data communicated in the system 100 overall and reduces the number of times that recharging is required to send data, enabling the time consumed for collecting all of the data to be shortened.

The system 100 resumes transmission of the data obtained by the second sensor 202 if the contents of the data obtained by the first sensor 202 and the contents of the data obtained by the second sensor 202 are not equivalent. As a result, the system 100 can transmit data whose contents have changed to the inspector terminal 101.

The system 100 sets the first node and the second node to be in the same group if the contents of data obtained from the first sensor 202 and the contents of the data obtained from the second sensor 202 are equivalent. The system 100 may further transmit the data obtained from the first sensor 202 and node IDs of the group. As a result, the system 100 reduces the volume of data transmitted in the system 100 and is able to also notify the inspector terminal 101 of the node IDs. By appending the node IDs to enable positions of the nodes to be identified from the node IDs, a server that analyzes the data can perform analysis using position information such as stress distribution when the data is related to stress, temperature distribution for temperature data, etc.

Further, the first node and the second node alone are assumed to be present in a given group. In this case, if the transmission of the data obtained from the second sensor 202 is resumed, the system 100 may remove the second node from the given group, and transmit the data obtained from the first sensor 202 together with the ID of the first node. As a result, the system 100 can transmit to the inspector terminal 101, the data of the second node for which the contents have changed and the ID of the node that obtained the data. Further, by transmitting the data obtained by the first sensor 202 together with the ID of the first node, the system 100 can notify the inspector terminal 101 that the group has been dissolved.

Further, the first node and plural second nodes are assumed to be present in a given group. In this case, if the contents of the data obtained by the first sensor 202 have been determined to have changed, the system 100 removes the first node from the group. The system 100 may transmit by any one of the second nodes in the group, the data obtained by the sensors 202 of the second nodes and identification information of the nodes in the group. As a result, even if the data of the group proxy node has changed, the system 100 can maintain the group and reduce the volume of communication.

Configuration may be such that the first node and the second node can communicate directly, or can communicate by a given hop count. As a result, the system 100 suppresses the volume of communication for creating a group and reduced the volume of communication in the system 100. Further, the data obtained by the sensors 202 tends to be similar the closer the distance is between the sensors 202. Therefore, the system 100 searches whether nearby nodes can be grouped, whereby the system 100 has a high possibility of creating a group without making inquiries to distant nodes.

The first node transmits the data obtained by the first sensor 202. If the second node receives the data obtained by the first sensor 202, the second node determines whether the contents of the data obtained by the first sensor 202 and the contents of the data obtained by the second sensor 202 are equivalent. If the contents of the data obtained by the first sensor 202 and the contents of the data obtained by the second sensor 202 are equivalent, the second node may suspend the transmission of the data obtained by the second sensor 202. As a result, since the determination result need not be transmitted to other nodes and the transmission by the node is suspended, the number of communications decreases, enabling the volume of communication in the system 100 to be reduced.

The data collection method described in the present embodiment may be implemented by executing a prepared program on a computer such as a personal computer and a workstation. The data collection program is stored on a non-transitory, computer-readable recording medium such as a hard disk, a flexible disk, a CD-ROM, an MO, and a DVD, read out from the computer-readable medium, and executed by the computer. The data collection program may be distributed through a network such as the Internet.

According to one mode of the present invention, an effect is achieved in that the volume of communicated data in the system overall can be suppressed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data collection method of a system that transmits and receives data by respective communications apparatuses among a plurality of communications apparatuses performing multihop communication, the data collection method comprising suspending transmission of data obtained from a second sensor, a communications apparatus among the plurality of communications apparatuses suspending the transmission by the second communications apparatus when a difference between data obtained from a first sensor of a first communications apparatus among the plurality of communications apparatuses and data obtained from the second sensor of a second communications apparatus among the plurality of communications apparatuses is within a threshold;

resuming the transmission of the data obtained from the second sensor, the communications apparatus among the plurality of communications apparatuses resuming the transmission by the second communications apparatus when, after the transmission of the data obtained from the second sensor has been suspended, the difference between the data obtained from the first sensor and the data obtained from the second sensor exceeds the threshold;

setting the first communications apparatus and the second communications apparatus to be in a same group, the communications apparatus among the plurality of communications apparatuses setting the first communications apparatus and the second communications apparatus to be in the same group when the difference between the data obtained from the first sensor and the data obtained by the second sensor is within the threshold; and transmitting the data obtained from the first sensor and identification information indicating that the first and the second communications apparatuses are in the same group, the first communications apparatus transmitting the data and the identification information when the communications apparatus among the plurality of communications apparatuses sets the first communications apparatus and the second communications apparatus to be in the same group.

2. The data collection method according to claim 1, further comprising:

removing the second communications apparatus from the group, the communications apparatus among the plurality of communications apparatuses removing the second communications apparatus when the transmission of the data obtained from the second sensor is resumed by the second communications apparatus; and transmitting the data obtained from the first sensor and identification information of the first communications apparatus, the first communications apparatus transmitting the data obtained from the first sensor and the identification information of the first communications apparatus when the communications apparatus among the plurality of communications apparatuses removes the second communications apparatus from the group.

3. The data collection method according to claim 1, further comprising removing the first communications apparatus from the group, the communications apparatus among the plurality of communications apparatuses removing the first communications apparatus from the group when after the first communications apparatus and the second communications apparatus have been set to be in the same group, the contents of the data obtained from the first sensor changes, wherein the transmitting of the data obtained from the first sensor and the identification information of the first communications apparatus includes the first communications apparatus transmitting the data obtained from the first sensor and the identification information of the first communications apparatus when the communications apparatus among the plurality of communications apparatuses removes the first communications apparatus from the group.

4. The data collection method according to claim 3, wherein
the removing of the first communications apparatus from the group includes the communications apparatus among the plurality of communications apparatuses removing the first communications apparatus from the group when the second communications apparatus is set in the same group as the first communications apparatus is a plurality of second communications apparatuses and the contents of the data obtained from the first sensor changes, and
the data collection method further comprising transmitting data obtained from a sensor of a second communications apparatus among the plurality of second communications apparatuses and identification information indicating that each second communications apparatus among the plurality of second communications apparatuses is set to be in the same group, the second communications apparatus among the plurality of second communications apparatuses transmitting the data obtained from the sensor and the identification information when the communications apparatus of the plurality of communications apparatuses removes the first communications apparatus from the group.

5. The data collection method according to claim 1, wherein
the suspending includes suspending the transmission of the data obtained from the second sensor, the transmission by the second communications apparatus being suspended when the difference between the data obtained from the first sensor of the first communications apparatus and the data obtained from the second sensor of the second communications apparatus among the plurality of communications apparatuses and communicable with the first communications apparatus is within the threshold.

6. The data collection method according to claim 1, wherein
the first communications apparatus transmits the data obtained from the first sensor,
the second communications apparatus upon receiving the data obtained from the first sensor, determines whether the difference between the data obtained from the first sensor and the data obtained from second sensor is within the threshold, and upon determining that the difference between the data obtained from the first sensor and the data obtained from the second sensor is within the threshold, suspends the transmission thereby of the data obtained from the second sensor.

7. A system that transmits and receives data by respective communications apparatuses among a plurality of communications apparatuses performing multihop communication, the system comprising:
a determining circuitry configured to determine whether a difference between data obtained from a first sensor of a first communications apparatus among the plurality of communications apparatuses and data obtained from a second sensor of a second communications apparatus among the plurality of communications apparatuses is within a threshold;
a control circuitry configured to:
suspend transmission of the data obtained from the second sensor, the control circuitry suspending the transmission by the second communications apparatus when the difference between the data obtained by the first sensor and the data obtained by the second sensor is determined to be within the threshold by the determining circuitry; and
resume the transmission of the data obtained from the second sensor, the control circuitry resuming the transmission by the second communications apparatus when, after the transmission of the data obtained from the second sensor has been suspended, the difference between the data obtained from the first sensor and the data obtained from the second sensor exceeds the threshold;
set the first communications apparatus and the second communications apparatus to be in a same group, the control circuitry setting the first communications apparatus and the second communications apparatus to be in the same group when the difference between the data obtained from the first sensor and the data obtained by the second sensor is within the threshold; and
transmit the data obtained from the first sensor and identification information indicating that the first and the second communications apparatuses are in the same group, the control circuitry transmitting the data and the identification information when the first communications apparatus and the second communications apparatus are set to be in the same group.

8. A non-transitory, computer-readable recording medium storing therein a data collection program of a system that transmits and receives data by respective communications apparatuses among a plurality of communications apparatuses performing multihop communication, the data collection program causing any one among the plurality of communications apparatuses to execute a process comprising:
suspending transmission of the data obtained from a second sensor, the transmission by a second communications apparatus being suspended when a difference between data obtained from a first sensor of a first communications apparatus among the plurality of communications apparatuses and data obtained from the second sensor of the second communications apparatus among the plurality of communications apparatuses is within a threshold;
resuming the transmission of the data obtained from the second sensor, the transmission by the second communications apparatus being resumed when, after the transmission of the data obtained from the second sensor has been suspended, the difference between the data obtained from the first sensor and the data obtained from the second sensor exceeds the threshold;
setting the first communications apparatus and the second communications apparatus to be in a same group, the first communications apparatus and the second communications apparatus being set to be in the same group when the difference between the data obtained from the first sensor and the data obtained by the second sensor is within the threshold; and
transmitting the data obtained from the first sensor and identification information indicating that the first and the second communications apparatuses are in the same group, the first communications apparatus transmitting the data and the identification information when the first communications apparatus and the second communications apparatus are set to be in the same group.

* * * * *